United States Patent
Pogatchnik, III et al.

(10) Patent No.: US 12,268,110 B2
(45) Date of Patent: Apr. 8, 2025

(54) TURF AERATOR

(71) Applicant: The Toro Company, Bloomington, MN (US)

(72) Inventors: Joseph W. Pogatchnik, III, Waconia, MN (US); Scott A. Thomson, Maple Grove, MN (US); Keith A. Goetz, New Prague, MN (US); Thomas R. Pfingsten, Savage, MN (US); Brian R. Hendrickson, Minneapolis, MN (US); John R. Kess, Bloomington, MN (US); Kelly S. Meemken, Savage, MN (US)

(73) Assignee: The Toro Company, Bloomington, MN (US)

( * ) Notice: Subject to any disclaimer, the term of this patent is extended or adjusted under 35 U.S.C. 154(b) by 717 days.

(21) Appl. No.: 17/390,023

(22) Filed: Jul. 30, 2021

(65) Prior Publication Data

US 2023/0036607 A1    Feb. 2, 2023

(51) Int. Cl.
*A01B 45/02*    (2006.01)
*A01B 63/00*    (2006.01)
(Continued)

(52) U.S. Cl.
CPC .......... *A01B 45/023* (2013.01); *A01B 63/008* (2013.01); *A01B 69/007* (2013.01); *A01B 79/005* (2013.01)

(58) Field of Classification Search
CPC ... A01B 45/023; A01B 63/008; A01B 69/007; A01B 79/005
See application file for complete search history.

(56) References Cited

U.S. PATENT DOCUMENTS 4,566,543 A    1/1986    Kotani
4,602,687 A    7/1986    Hansen
(Continued)

FOREIGN PATENT DOCUMENTS

EP    2 361 490 A1    8/2011
EP    2 644 012 A1    10/2013
EP    2 644 013 A1    10/2013

OTHER PUBLICATIONS

Great Britain Combined Search and Examination Report for Application No. GB2318619.0 mailed Feb. 21, 2024.
(Continued)

*Primary Examiner* — Dino Kujundzic
(74) *Attorney, Agent, or Firm* — Merchant & Gould P.C.

(57) ABSTRACT

An aerator for a turf surface has a traction control, an OPC bail, and an aeration bail capable of single handed operation. A controller automatically lowers a tine head to begin aerating at a start location marked when the aeration bail is closed and lifts the tine head to end aeration at an end location marked when the aeration bail is released. The controller further causes the tines that enter the turf surface at the start location to penetrate to a desired hole depth. The controller also automatically adjusts ground speed to maintain a desired hole spacing during an aeration pass, but permits the operator to speed up during a turnaround between passes with a steerable front wheel freewheeling to mitigate wheel scrubbing. A handle assembly having a spring counterbalance is height adjustable and automatically engages a parking brake when placed in an upright non-operating position.

25 Claims, 12 Drawing Sheets

(51) Int. Cl.
*A01B 69/00* (2006.01)
*A01B 79/00* (2006.01)

(56) References Cited

U.S. PATENT DOCUMENTS

| | | | |
|---|---|---|---|
| 5,628,369 | A | 5/1997 | Brown |
| 5,651,241 | A | 7/1997 | Wegner |
| 5,797,458 | A | 8/1998 | Simon et al. |
| 6,102,129 | A | 8/2000 | Classen |
| 6,708,773 | B1 | 3/2004 | Kinkead et al. |
| 8,255,126 | B2 * | 8/2012 | Hunt ............... A01B 45/023 701/50 |
| 8,733,477 | B1 | 5/2014 | Cook |
| 10,779,454 | B2 | 9/2020 | Papke et al. |
| 2005/0165521 | A1 | 7/2005 | Gruhn |
| 2008/0029278 | A1 | 2/2008 | Wynings |
| 2010/0314143 | A1 | 12/2010 | Harris, III |
| 2011/0213530 | A1 * | 9/2011 | Hunt ............... A01B 45/023 701/50 |
| 2013/0075117 | A1 | 3/2013 | Hall et al. |
| 2013/0248213 | A1 | 9/2013 | Wessel |
| 2013/0255976 | A1 | 10/2013 | Georgouilias et al. |
| 2015/0107863 | A1 | 4/2015 | Bryant et al. |
| 2015/0216102 | A1 | 8/2015 | Georgouilias et al. |
| 2016/0135353 | A1 * | 5/2016 | Bryant ............... B60K 11/08 172/21 |
| 2019/0230839 | A1 | 8/2019 | Papke et al. |
| 2019/0389519 | A1 | 12/2019 | Bergsten et al. |
| 2020/0146213 | A1 | 5/2020 | Goman et al. |
| 2020/0396886 | A1 | 12/2020 | Frodigh et al. |
| 2020/0396887 | A1 | 12/2020 | Frodigh et al. |
| 2021/0076553 | A1 | 3/2021 | Kinkead et al. |
| 2021/0112696 | A1 | 4/2021 | Carmen et al. |
| 2021/0146995 | A1 * | 5/2021 | Miyashita ............ B62D 15/025 |
| 2022/0248589 | A1 * | 8/2022 | Davern ............... A01B 69/008 |

OTHER PUBLICATIONS

Great Britain Further Search Report for claims 6 and 7 for Application No. GB2211119.9 dated Sep. 1, 2023.
Great Britain Further Search Report for claims 8-14 for Application No. GB2211119.9 dated Sep. 1, 2023.
Great Britain Further Search Report for claims 15-20 for Application No. GB2211119.9 dated Sep. 1, 2023.
Great Britain Further Search Report for claims 21-23 for Application No. GB2211119.9 dated Sep. 1, 2023.
Great Britain Further Search Report for claims 24-25 for Application No. GB2211119.9 dated Sep. 1, 2023.
Great Britain Combined Search and Examination Report for Application No. GB2211119.9 mailed Jan. 16, 2023.
Great Britain Search Report for Application No. GB2413348.0 mailed Jan. 8, 2025, 5 pages.

* cited by examiner

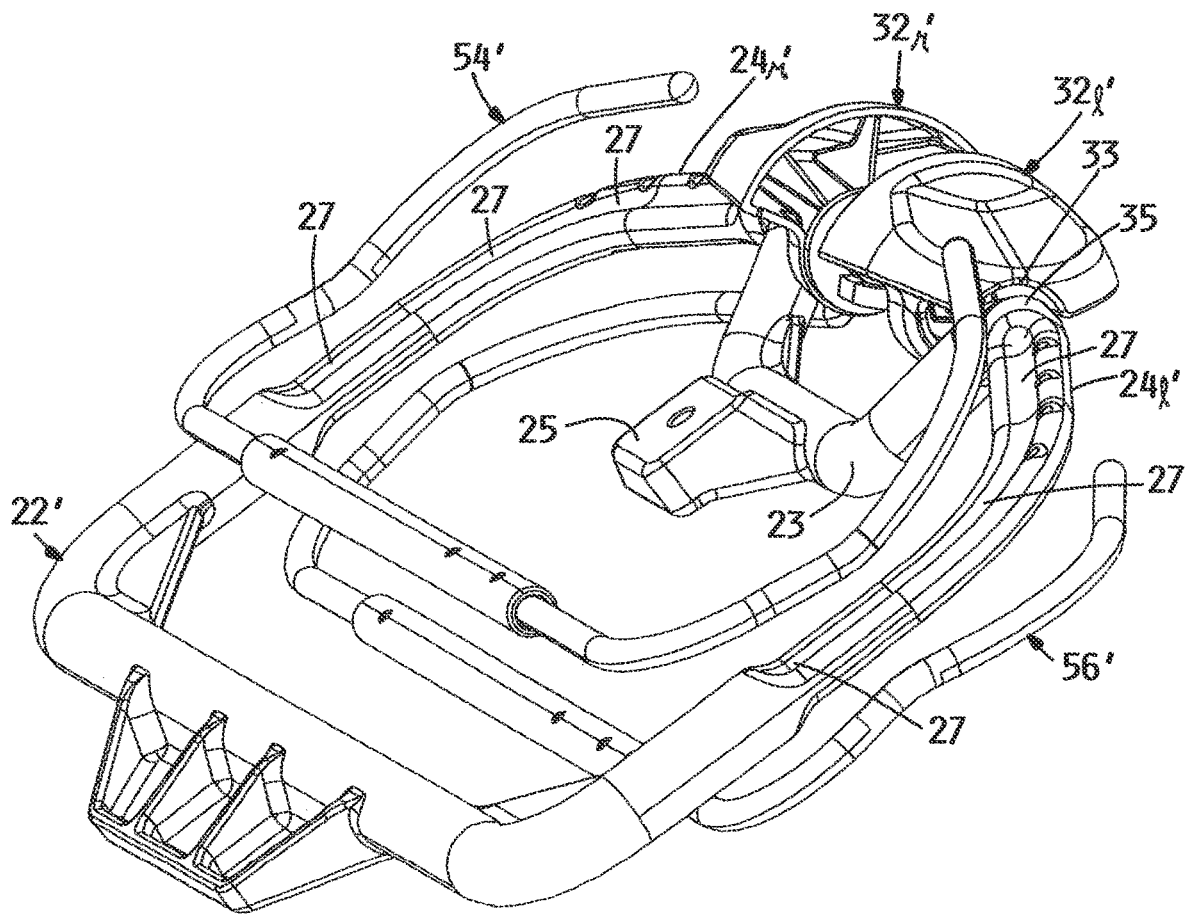
Fig. 8
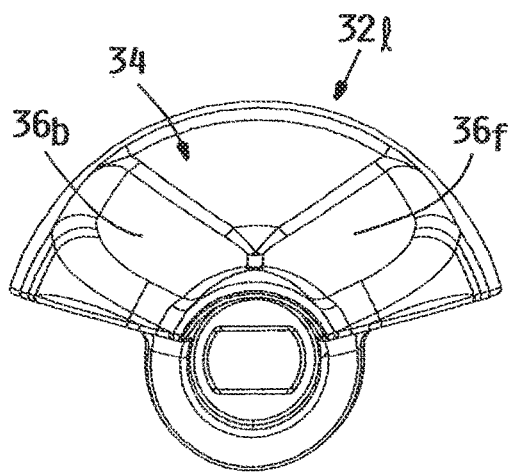 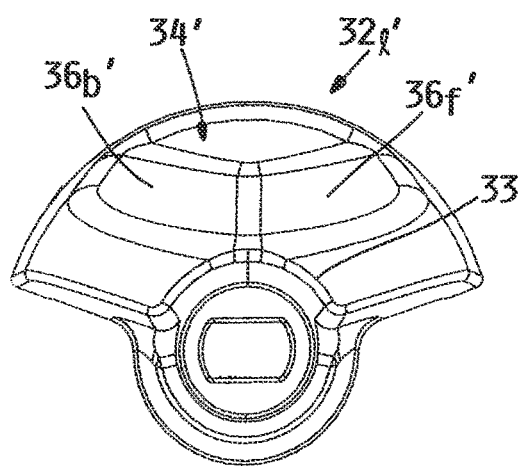
Fig. 9A          Fig. 9B

TURF AERATOR

TECHNICAL FIELD

This invention relates to an aerator having a plurality of tines to form or punch holes in a turf surface to improve the agronomic health of the turf surface.

BACKGROUND OF THE INVENTION

The Applicant herein, The Toro Company, has long manufactured and sold turf aerators which form or punch an array of spaced vertical holes in a turf surface as the aerator passes over the turf surface. One example of such an aerator is the Toro ProCore® 648 turf aerator which is guided by a walking operator who holds a handle assembly. The ProCore® 648 aerator has a self-propelled frame which carries a tine head. The tine head includes a plurality of vertically reciprocal, rotatable side-by-side tine assemblies, each of which has multiple hole forming tines. The Applicant's prior U.S. Pat. No. 7,096,969 relates to the ProCore® 648 aerator.

In the ProCore® 648 aerator and in other similar aerators, the aerator frame is supported by a plurality of wheels in a tricycle configuration comprising a pair of rear wheels and a front wheel. The front wheel is carried on a wheel mount that is pivotal on the front of the frame about a vertical axis. The handle assembly is attached to and extends forwardly from the front wheel mount such that the operator walks ahead of the frame during operation of the aerator. The operator can swing the handle assembly from side-to-side to pivot the front wheel to steer the aerator.

The handle assembly carries a pivotal traction bail that is split into left and right hand grips to allow the operator to engage the traction drive of the aerator in forward or reverse. In addition, the handle assembly carries a tine head switch for lowering the tine head and engaging the rotation of the tine assemblies by depressing one end of the switch or for raising the tine head and disengaging the rotation of the tine assemblies by depressing the opposite end of the switch. Thus, the operator uses the tine head switch to start aerating the turf surface at the beginning of a pass of the aerator across the turf surface and to stop aerating the turf surface at the end of the pass of the aerator across the turf surface.

The ProCore® 648 aerator is commonly used on the greens of golf courses to maintain the health of the turf surface on which a golfer putts. The edges of a golf course green are defined by a collar that is formed by a turf surface that is often composed of a different variety of grass than the grass used on the green itself. In addition, the turf surface on the collar is maintained at a much higher height of cut than the turf surface on the green to have a clear demarcation between the green and the surrounding collar. The width of the ProCore® 648 aerator is significantly less than the width or length of the green. Thus, in order to aerate the entire green, the ProCore® 648 aerator must make multiple passes back and forth over the green.

The tine head is carried on the rear end of the frame of the ProCore® 648 aerator. In this position, the operator is separated from the tine head by approximately the entire length of the aerator. Typically, an aerating pass begins with the aerator positioned on the collar with the tine head located in a raised position with the tines being disengaged. To begin an aerating pass, the operator engages the traction drive to propel the aerator forwardly on the collar towards the edge of the green.

As the operator reaches the edge of the green, the tine head is in a raised position with the tines disengaged. If the operator were to use the tine head switch at this moment in time to lower the tine head and engage the rotation of the tines, the tine head would begin aerating some portion of the collar before reaching the edge of the green due to the fact that the tine head trails the operator. However, aeration of the collar is undesirable since the desired hole spacing, hole diameter, type of tine, and frequency of aeration on a collar is often different from that which is desirable for a green. In addition, it carries the risk of transporting particles or shreds of the different grass variety used on the collar onto the green thereby potentially contaminating the purity of the turf surface used on the green.

The operator can attempt to mitigate these results by timing the moment that he or she actuates the tine head switch to drop the tine head and engage the tines so that the rotating tines first enter the ground immediately inside the collar on the very edge of the green. This is difficult to do even for a skilled and experienced operator. In addition, this procedure must be repeated at the end of the aerating pass as the aerator transitions from the green back onto the collar on the opposite side of the green. The operator must similarly time the moment that he or she actuates the tine head switch to raise the tine head and stop the rotation of the tines to allow the tine head to lift up out of the ground at the very edge of the opposite side of the green without aerating the adjacent collar.

Many passes are often needed to aerate a single green and multiple greens may need to be aerated on a selected day. The attention required from the operator to properly control the drop and lift of the tine head to avoid aerating the collar while aerating the green is significant, requires a skilled operator, and is tiring even for a skilled operator.

Another aeration problem on a fine turf surface such as a golf course green is known in the art as "tufting". In the ProCore® 648 aerator, the tine assemblies contained in the tine head do not all enter and leave the turf surface at the same time but are disposed in pairs that rotate out of phase with one another. As the tine head drops towards the turf surface, one pair of the tines will be the first to enter the turf surface. In some cases, the tines in that pair are inclined relative to the turf surface as they approach such that they do not enter to their full depth. Instead of leaving a clean substantially vertical hole in the turf surface, the tines enter more shallowly than desired and create a small longitudinal slit in the turf surface with a small tuft of the turf surface being left at the exit end of the slit. This is obviously a disadvantage and may in extreme cases require repair where it occurs.

SUMMARY OF THE INVENTION

A first aspect of this invention relates to an aerator for a turf surface having a frame capable of movement over the turf surface. A plurality of tine assemblies are movable into and out of the turf surface at different times from one another during each cycle of operation in a plurality of repeating cycles of operation for creating aeration holes in the turf surface. A tine head is mounted on the frame for carrying the tine assemblies. The tine head is vertically movable on the frame between a raised, non-operational position in which the tine assemblies are not aerating the turf surface and a lowered operational position in which the tine assemblies are aerating the turf surface. At least one tine assembly sensor provides tine assembly data comprising an operational speed of the tine assemblies and positions of the tine assemblies relative to the tine head. A microprocessor based controller receives and uses the tine assembly data to automatically lower the tine head from its non-operational position in a manner that causes whichever tine assembly is first to move into the turf surface to substantially penetrate the turf surface to a preselected hole depth.

A second aspect of this invention relates to an aerator for aerating a turf surface which comprises a frame having a traction drive for self-propelling the frame at least in a forward direction over the turf surface. A tine head is carried on the frame. The tine head has a plurality of vertically reciprocal, side-by-side tines for punching aeration holes in the turf surface. The tine head is vertically movable on the frame between a raised non-operational position in which the tines are located above the turf surface and a lowered operational position in which the tines engage the turf surface to form aeration holes in the turf surface. An aeration control is provided having a first state that allows an operator to establish a targeted aeration start location on the turf surface and a second state that allows an operator to establish a targeted aeration end location on the turf surface for each pass of the aerator across the turf surface. A microprocessor based controller is also provided. The controller upon receipt of the targeted aeration start location automatically initiates lowering of the tine head at a moment that permits at least some of the tines carried in the tine head to enter the turf surface to begin aerating the selected turf surface approximately at the targeted aeration start location. In addition, the controller upon receipt of the targeted aeration end location automatically initiates lifting the tine head at a moment that permits the tines carried in the tine head to exit the turf surface to end aerating the turf surface approximately at the targeted aeration end location.

A third aspect of this invention relates to a method of operating an aerator to aerate a selected turf surface on which aeration is desired with the selected turf surface having a first boundary with a non-selected surface on which aeration is not desired. The method comprises propelling the aerator in a forward direction of motion towards the selected turf surface with a tine head capable of creating aeration holes in the selected turf surface disposed at a height above the selected turf surface, detecting when a reference feature located on the aerator forward of the tine head taken with respect to the forward direction of motion crosses over the first boundary and is located over or in contact with the selected turf surface, establishing an instantaneous location of the reference feature over or in contact with the selected turf surface as a targeted aeration start location, transmitting the establishment of the targeted aeration start location to a microprocessor based controller, and the controller automatically initiating lowering the tine head at a moment that is calculated by the controller to permit at least some vertically reciprocating hole forming tines carried in the tine head to enter the selected turf surface to begin aerating the selected turf surface approximately at the targeted aeration start location.

A fourth aspect of this invention comprises an aerator for aerating a turf surface. The aerator comprises a frame having a traction drive for self-propelling the frame at least in a forward direction at a variable speed over the turf surface. A plurality of side-by-side tine assemblies is carried on the frame. The tine assemblies are vertically reciprocal relative to the frame for punching aeration holes in the turf surface. A control console carries operational controls. The controls comprise a fixed hand grip which is configured to be gripped by a hand of an operator, a movable traction control which is configured to be engaged and moved by at least one digit of the operator's hand while the operator's hand is gripping the fixed hand grip to control the variable forward speed of the frame, and a first pivotal bail grip adjacent the fixed hand grip. The first pivotal bail grip is configured to be gripped by fingers on the operator's hand and closed against the fixed hand grip to start an aeration operation and is further configured to be released by the operator's fingers for movement away from the fixed hand grip to end an aeration operation.

A fifth aspect of this invention relates to an aerator for aerating a turf surface. The aerator comprises a frame having a traction drive for self-propelling the frame at least in a forward direction at a variable speed over the turf surface. A plurality of side-by-side tine assemblies is carried on the frame, the tine assemblies being vertically reciprocal relative to the frame for punching aeration holes in the turf surface. A microprocessor based controller is provided which stores desired fore-and-aft hole spacing and automatically adjusts an operational speed of the traction drive during each aeration pass of the aerator to achieve the desired hole spacing.

A sixth aspect of this invention comprises an aerator for aerating a turf surface. The aerator comprises a frame having a traction drive for self-propelling the frame at least in a forward direction over the turf surface. A plurality of side-by-side tine assemblies is carried on the frame, the tine assemblies being vertically reciprocal relative to the frame for punching aeration holes in the turf surface. A handle assembly is operatively connected to a steerable wheel for allowing a walking operator to guide and steer the frame. The handle assembly is adjustable in height on the frame and has a weight which is substantially offset by a spring counterbalance acting between the handle assembly and the frame to ease adjustment of the handle assembly on the frame.

BRIEF DESCRIPTION OF THE DRAWINGS

This invention will be described more fully in the following Detailed Description, when taken in conjunction with the following drawings, in which like reference numerals refer to like elements throughout.

FIG. 8 is a perspective view of an alternative form of certain of the operational controls depicted in FIGS. 4-7;

FIG. 9A is a side elevational view of one of the thumb wheels used in the operational controls depicted in FIGS. 4-7;

FIG. 9B is a side elevational view of one of the thumb wheels used in the operational controls depicted in FIG. 8;

DETAILED DESCRIPTION

Figure 1:
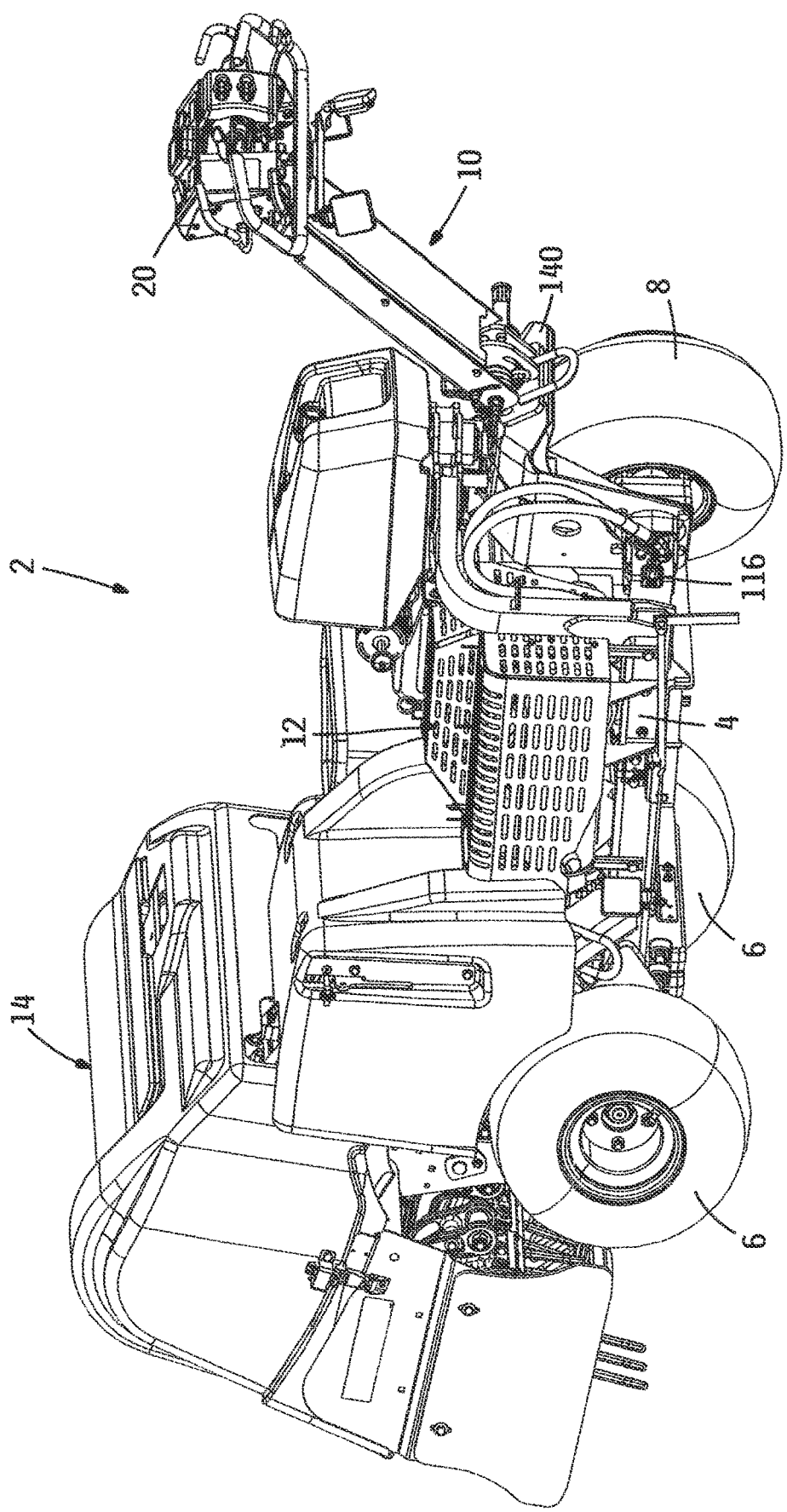
FIG. 1 is a front perspective view of one embodiment of an aerator according to this invention.

One embodiment of an aerator 2 according to this invention is illustrated in FIG. 1. Aerator 2 is of a type that has long been manufactured and sold by the Applicant of this invention as the ProCore® 648 walk aerator.

Figure 2:
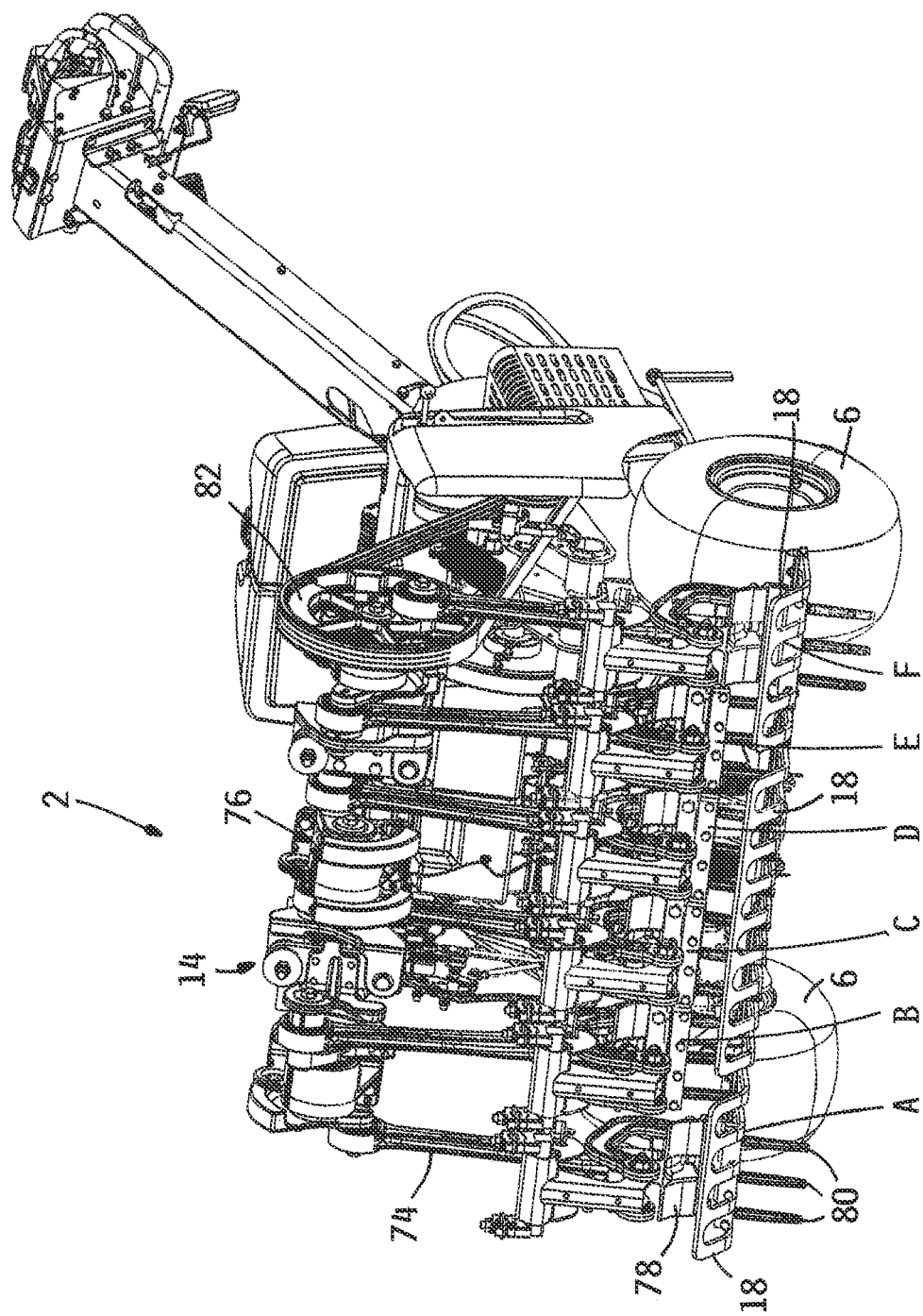
FIG. 2 is a rear perspective view of the aerator of FIG. 1 with portions of a tine head having been removed to better illustrate various tine assemblies carried by the tine head.
Figure 3:
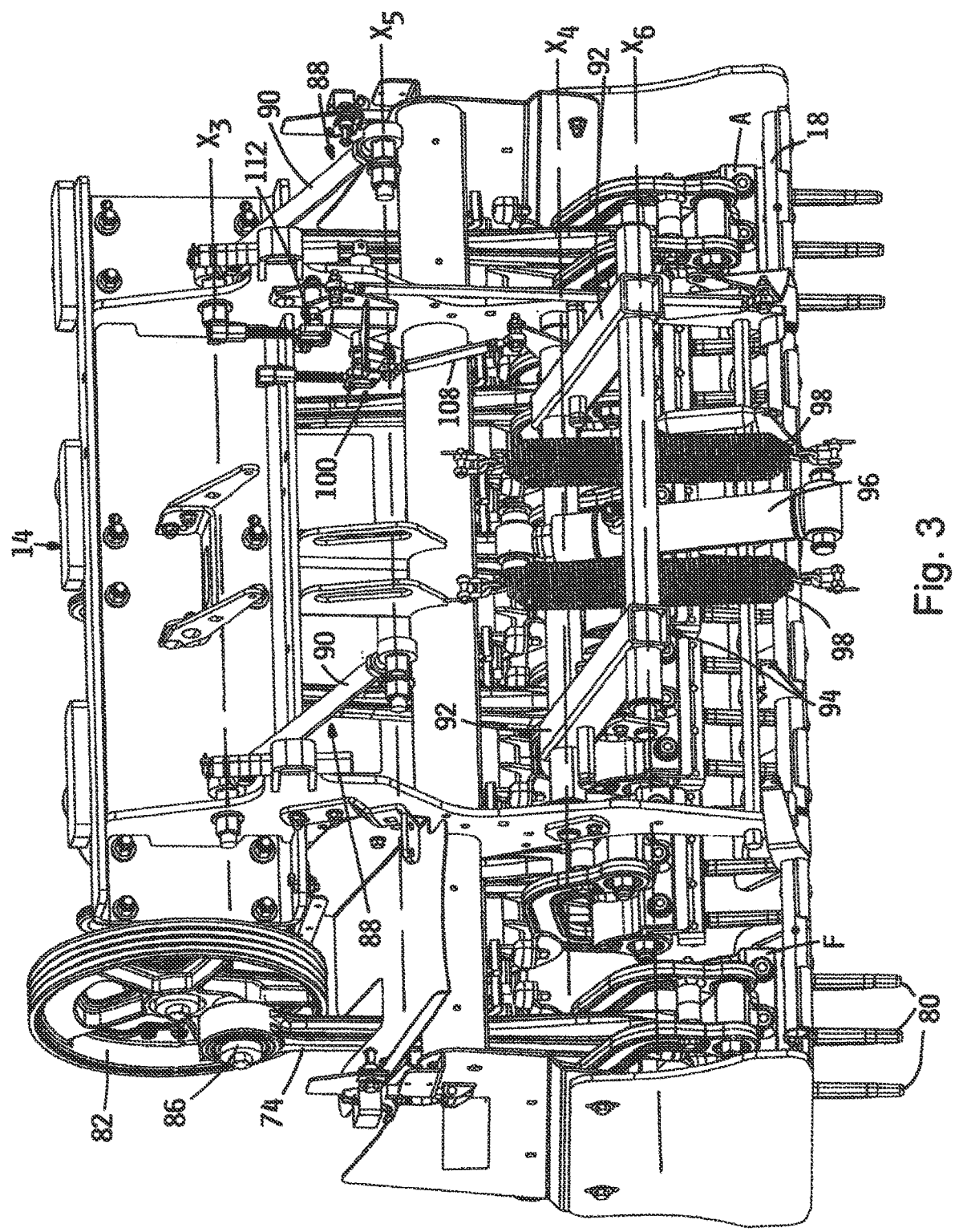
FIG. 3 is a front perspective view of the tine head of the aerator of FIG. 1 with portions of the tine head having been removed to better illustrate the four bar linkages supporting the tine head for vertical movement on a frame of the aerator as well as a sensor for determining the height of the tine head relative to the frame of the aerator.

Many features of the Applicant's ProCore 648® aerator are used in the exemplary embodiment of aerator 2 disclosed herein. Referring to FIGS. 1-3, these features include:
a) the frame 4, the tricycle configuration of a pair of rear wheels 6 and a single front wheel 8 on frame 4, and a handle assembly 10 coupled to front wheel 8 with handle assembly 10 being pivotal about a vertical axis to allow a walking operator at the front of frame 4 to steer frame 4,
b) a prime mover 12 carried on frame 4, such as an internal combustion engine, a hybrid engine/electric prime mover, an entirely electric prime mover, or a hydrogen based prime mover such as a hydrogen fuel cell;
c) a tine head 14 carried on frame 4 and how tine head 14 is lifted and lowered relative to frame 4 and the turf surface,
d) the nature of a plurality of tine assemblies A-F within tine head 14 and how tine assemblies A-F are driven,
e) the placement of rear wheels 6 inboard and ahead of the aeration swath,
f) the traction drive 16, and
g) a ground contour sensing system including among other things a ground contour following skid or turf guard 18 for adjusting the vertical position of tine head 14 in response to changes in ground contour to maintain a preselected hole depth.

These features are set forth in the Applicant's U.S. Pat. No. 7,096,969 which is hereby incorporated by reference.

The Operational Controls

Aerator 2 of this invention is provided with a set of operational controls that ease the task of operating aerator 2. Referring now to FIGS. 4-7, the controls are located on a control console 20 at the front and top of handle assembly 10. Control console 20 mounts a generally C-shaped handle 22 on control console 20. The closed rear side of C-shaped handle 22 is fixed to control console 20 so that handle 22 is stationary on control console 20. The inwardly projecting ends on the open front side of C-shaped handle 22 form left and right hand grips 24l, 24r for the operator's hands. Hand grips 24l and 24r angle slightly forwardly as they extend inwardly as best shown in FIG. 5. Left and right as used herein shall mean the operator's left and right when the operator is standing forward of control console 20 and faces towards tine head 14.

Control console 20 has a forward projection 26 which extends between hand grips 24l, 24r with a front end of projection 26 being located forwardly of hand grips 24l, 24r. A traction control 28 comprises a shaft 30 rotatably journalled within projection 26 to rotate about a lateral horizontal axis of rotation. Opposite ends of shaft 30 extend laterally beyond projection 26 to allow a left thumb wheel 32l and right thumb wheel 32r to be non-rotatably secured to the opposite left and right ends of shaft 30 so that thumb wheels 32l, 32r rotate with shaft 30. When so secured, thumb wheels 32l, 32r substantially fill in the space between hand grips 24l and 24r and the sides of projection 26. In one embodiment, thumb wheels 32l, 32r may be made of plastic for ease of manufacture and cost reduction.

Figure 4:
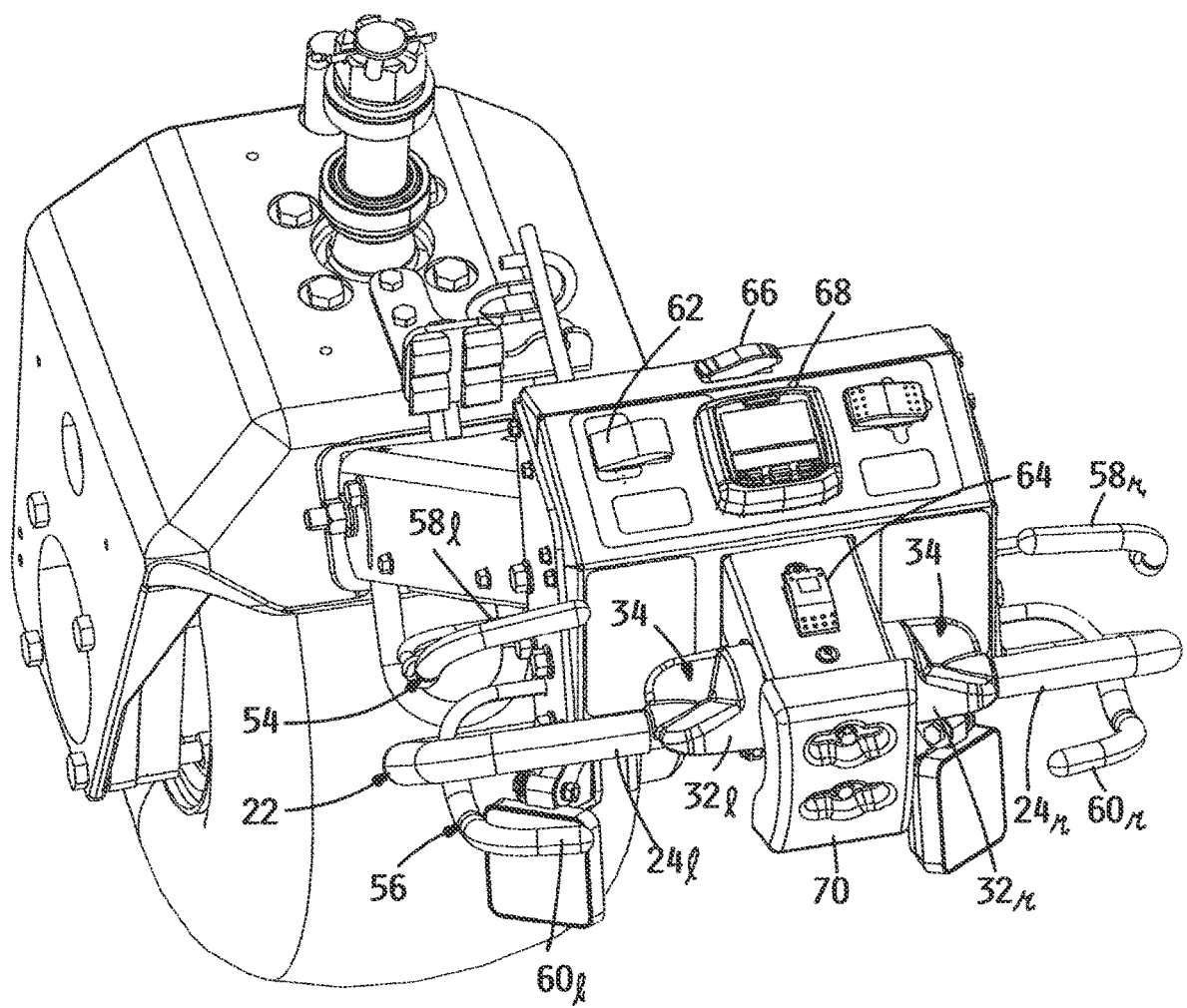
FIG. 4 is an enlarged front perspective view of a handle assembly of the aerator of FIG. 1 and of a control station carried on top of the handle assembly.
Figure 5:
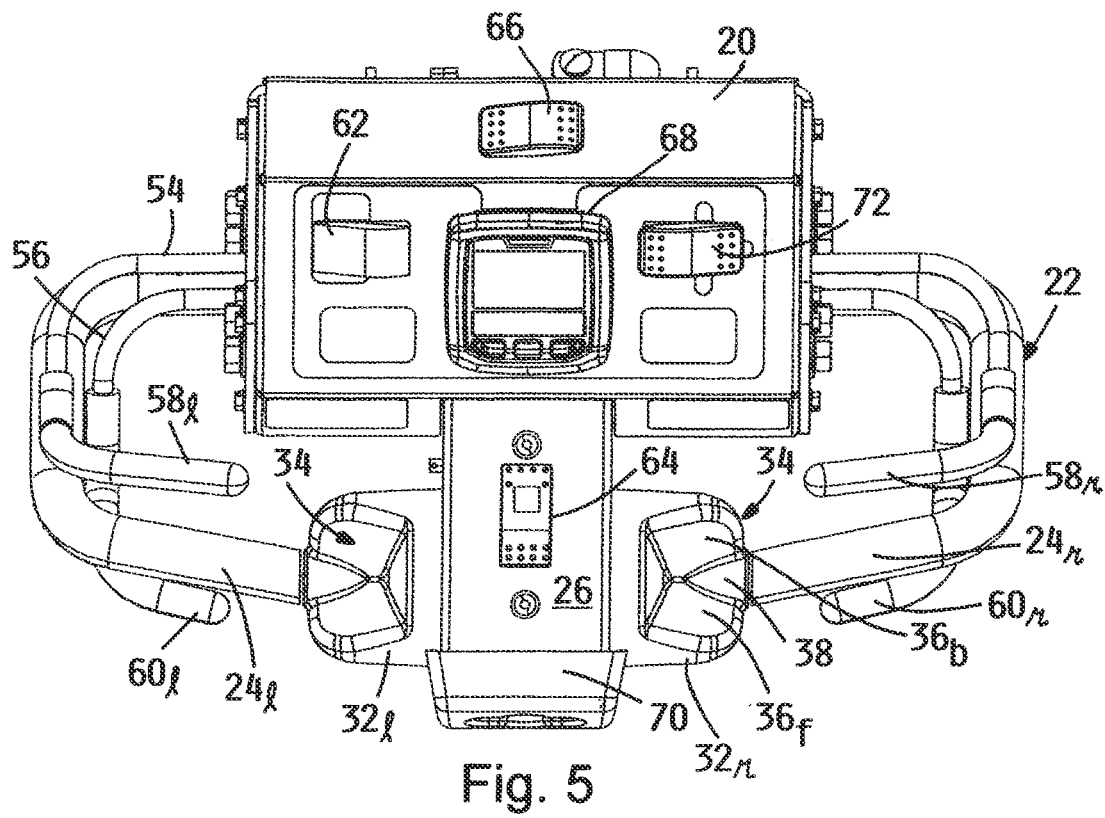
FIG. 5 is a top view of the control station of the handle assembly shown in FIG. 4.
Figure 6:
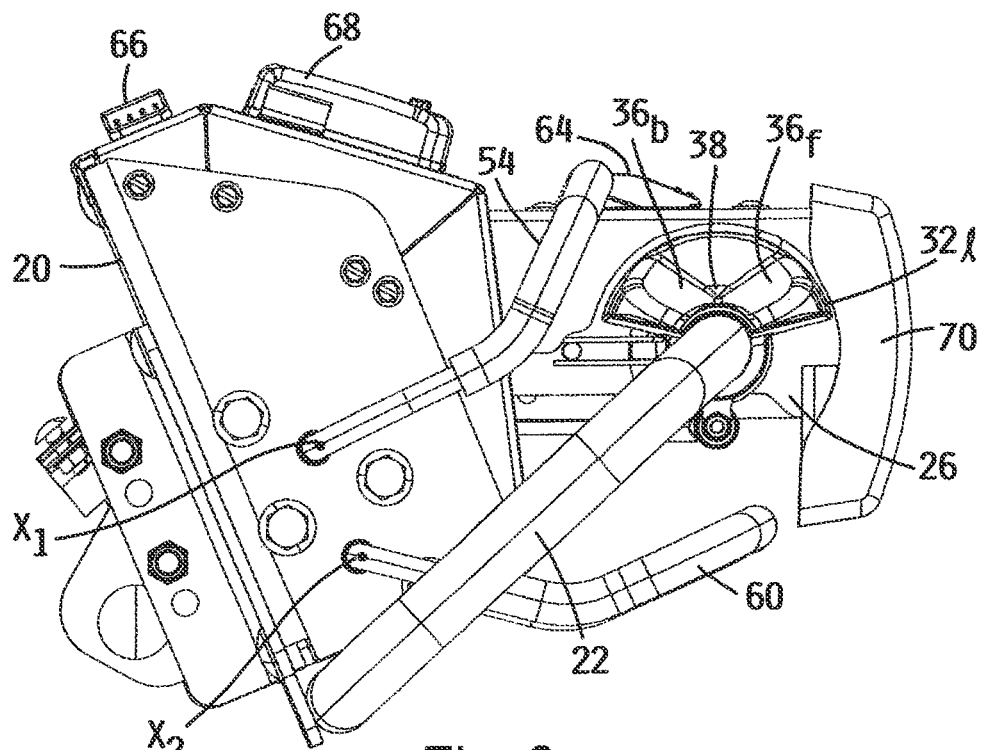
FIG. 6 is a side elevational view of the control station shown in FIG. 4.

Referring to FIGS. 4-6, the top of each thumb wheel 32l or 32r is provided with a laterally extending, upwardly facing notch 34 for receiving the thumb of whatever hand the operator is using to grip the adjacent hand grip 24l or 24r of handle 22. Each notch 34 has sloped front and back walls 36f, 36b which extend upwardly from a floor 38 of notch 34. Front and back walls 36f, 36b diverge away from one another as notch 34 extends laterally outwardly. Thus, notch 34 is widest at its outer end with the width of notch 34 gradually narrowing until notch 34 disappears at its inner end. Floor 38 of each notch 34 is slightly rounded to substantially match its curvature to the curvature of the inner end of the adjacent hand grip 24l or 24r.

Figure 7:
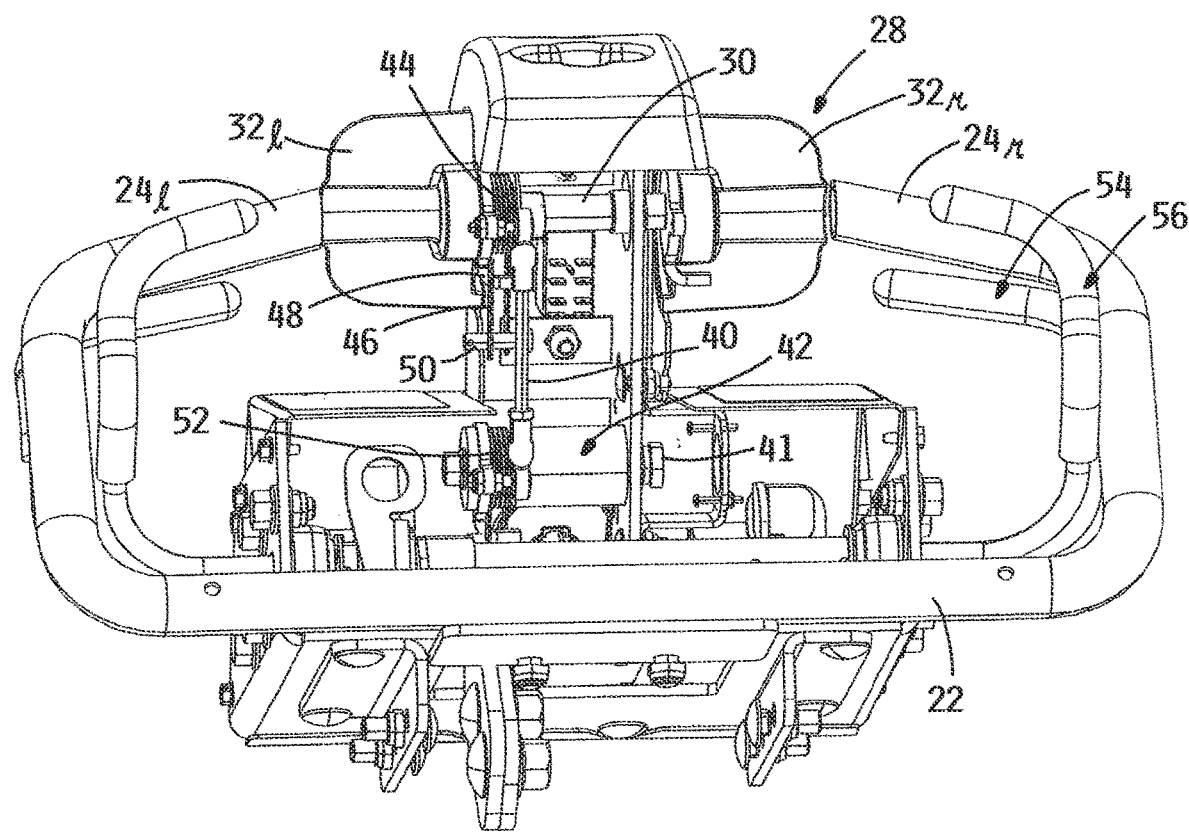
FIG. 7 is a bottom view of the control station shown in FIG. 4.

Referring now to FIG. 7, shaft 30 of traction control 28 is linked by a tie rod 40 to a rotary shaft 41 of a traction control sensor assembly 42 for operating a rotary motion sensor (not shown), such as a potentiometer, positioned adjacent the end of shaft 41 to determine the amount and direction of rotation of shaft 30 of traction control 28 from neutral. Traction control 28 is biased to return to neutral by a torsion spring 44 having a pair of parallel legs 46 which receive a finger 48 of traction control 28 between them. As traction control 28 is rotated in a given direction, finger 48 pushes on one leg 46 of torsion spring 44 to wind torsion spring 44 up with the other leg of torsion spring 44 being prevented from rotating by a fixed pin 50 that is also received between the legs of torsion spring 44. Obviously, torsion spring 44 works in both directions of rotation of traction control 28 to allow bidirectional rotation of traction control 28 in opposite directions out of neutral followed by return to neutral whenever the operator releases traction control 28. A similar return to neutral torsion spring 52 may be used on shaft 41 of traction control sensor assembly 42 if so desired.

Referring again to FIGS. 4-6, control console 20 further mounts a generally C-shaped operator presence control (OPC) bail 54 and a generally C-shaped aeration bail 56. As best shown in FIG. 6, the closed rear sides of C-shaped bails 54, 56 are journalled for rotation in control console 20 about horizontal, laterally extending, upper and lower pivot axes $X_1$ and $X_2$, respectively. The inwardly projecting ends on the open front sides of C-shaped bails 54, 56 form left and right bail grips 58*l*, 58*r* for the palms of the operator's hands as to OPC bail 54 and left and right bail grips 60*l*, 60*r* for the fingers of the operator's hands as to aeration bail 56. The left and right bail grips 58*l*, 58*r* of OPC bail 54 and 60*l*, 60*r* of aeration bail 58 are angled slightly forwardly as they extend inwardly similarly to the hand grips 24*l*, 24*r* of handle 22 to substantially overlie and underlie hand grips 24*l*, 24*r* of handle 22, respectively.

Bails 54, 56 are biased by springs (not shown) into the normally disengaged positions thereof shown in FIGS. 4-6 in which the hand grips of the bails are spaced from the hand grips of handle 22. The operator must place the palm of one of the operator's hands on one of the bail grips 58*l* or 58*r* of OPC bail 54 and push downwardly thereon to rotate OPC bail 54 about its axis $X_1$ until bail grip 58*l* or 58*r* comes close to or into contact with the corresponding hand grip 24*l* or 24*r* of handle 22. The operator can then further close the fingers of the hand in contact with OPC bail 54 around the underside of handle 22 to hold OPC bail 54 against handle 22. This will change the state of an OPC switch or sensor (not shown) to signal that the operator is present to enable the operation of at least traction drive 16 of aerator 2.

With the palm of the operator's hand holding OPC bail 54 in engagement with the handle 22, the operator can then at any time choose to uncurl his or her fingers while keeping the palm of the operator's hand closed around the now mated hand grips of OPC bail 54 and handle 22. The operator can then reach down with his or her uncurled fingers to grab the corresponding bail grip 60*l* or 60*r* of aeration bail 56 and then rotate aeration bail 56 upwardly about its axis $X_2$ to additionally close aeration bail 56 relative to the corresponding hand grip 24*l* or 24*r* of handle 22. This will change the state of an aeration switch or sensor (not shown) to provide a signal that is used in various embodiments of an aeration control system and methods of aeration of this invention that will be described hereafter.

Other switches mounted on control console 20 include a three position cruise control switch 62 having off, on, and set positions to relieve the operator of having to manually and continuously keep traction control 28 in a rotated position during transport or aeration of aerator 2. The set position comprises a momentary depression of switch 62 in the on position to store the current ground speed of frame 4 as established by the current rotational position of traction control 28 as the cruise control speed. The operator may then release traction control 28 while a cruise control function of the aeration control system automatically maintains the ground speed of frame 4 at the set ground speed. This describes the operation of the cruise control function in a transport mode of operation rather than an aeration mode of operation, namely aeration bail 56 has not been closed by the operator against handle 22.

An aeration mode control switch 64 is also provided on control console 20 to allow the operator to select between two different aeration modes that operate differently upon the closure of aeration bail 56 against handle 22. The first mode is an immediate drop mode in which tine head 14 is immediately released upon closure of aeration bail 56 to lower into contact with the ground to commence aeration of the turf surface. The second mode is a delayed drop mode in which one embodiment of the aeration control system and method of this invention automatically controls the drop of tine head 14 upon closure of aeration bail 56 so that aeration begins only when a targeted location on the turf surface is reached as will be described more fully hereafter.

Another toggle control switch 66 is also provided on control console 20 to select an aeration mode of operation which allows aeration to take place or a transport mode when of operation in which aeration is disabled and aerator 2 is simply being driven from one location to another. When the operator uses switch 66 to select operation in either the aeration mode or the transport mode, that selection governs the maximum ground speed at which aerator 2 can be driven in each mode. In one embodiment, the maximum transport speeds can be factory preset and be non-adjustable, e.g. 4.0 mph in transport and 2.5 mph in aeration. Alternatively, both maximum ground speeds may be operably set within predetermined limits by the operator or a supervisor using an Info Center data display/data input device 68. The position of traction control 28 is read with more or less sensitivity by the control system depending upon which mode has been selected so that a fully open traction control will produce the maximum ground speed allowed in each mode with the traction control proportionally reducing the ground speed in each mode to zero as traction control 28 returns to neutral.

In addition, a bump stop switch 70 is positioned on the front end of forward projection 26 of control console 20. An operator is able to immediately stop forward motion of aerator 2, to lift tine head 14, and to stop rotation of tine assemblies A-F simply by bumping against or otherwise pushing in on bump stop switch 70. The operator can then engage reverse traction drive to back aerator 2 away from the operator. In addition, control console 20 carries a light switch 72 for turning on and off various ground illuminating lights carried on frame 4 for use in low light conditions.

Traction control 28, OPC bail 54, and aeration bail 56 permit improved ease of operation. The operator is normally standing to one side of handle assembly 10 at the front of frame 4. Assuming the operator is right handed, the operator can now stand to the side of and/or slightly forward or behind the right hand grip 24*r* of handle 22, rotate his her arm inwardly around the operator's shoulder with the palm of the operator's right hand now facing forwardly with the thumb of the right hand now facing inwardly, and use the palm of his or her right hand to close and hold the right hand grip 58*r* of OPC bail 54 against the right hand grip 24*r* of handle 22. With his or her right arm easily rotated in this manner and with the fingers of the right hand curled around the underside of the right hand grip 24*r* of handle 22, the thumb of the operator's right hand will fit naturally and comfortably within notch 34 in the right thumb wheel 32*r* of traction control 28.

To drive aerator 2 forwardly in the same forward direction that the operator is facing, the operator need then only use the thumb of his or her right hand on front wall 36*f* of notch 34 in right thumb wheel 32*r* to rotate right thumb wheel 32*r* of traction control 28 forwardly/downwardly. The speed of forward movement of aerator 2 is set by how far forwardly out of neutral right thumb wheel 32*r* is rotated. The operator can stop the forward motion of aerator 2 easily by releasing the pressure of his or her right thumb on thumb wheel 32*r* or by lifting the thumb of his or her right hand out of notch 34 of thumb wheel 32*r* to in either case allow the return to neutral spring of traction control 28 automatically return traction control 28 to neutral.

Assuming though in the example above that the operator keeps traction control 28 engaged without permitting its return to neutral, aeration can be easily initiated, whether the user has selected the immediate mode or delayed drop mode, simply by uncurling the fingers of his or her right hand from right hand grip 24r of handle 22, by reaching down and grabbing right hand grip 60r of bail 56, and by then pulling up with his or her fingers to close right hand grip 60r of aeration bail 56 against right hand grip 60r of handle 22. In prior known aerators where the traction drive was engaged by closing a traction bail against the hand grip of handle 22 using one hand of the operator, the operator could initiate aeration only by using the operator's other hand to search for, locate, and throw a separate switch provided elsewhere on control console 20. The need for this two handed procedure is now avoided in aerator 2 of this invention. The operator can maintain single handed control of both traction and aeration while not requiring the operator to shift his or her body or use a different arm to reach another control or to shift his or her eyes from a forward facing gaze in order to start and stop aeration.

If the operator wished to propel aerator 2 in reverse, a right handed operator would now turn around and face rearwardly to look in the direction aerator 2 will be moving. The operator would now be able to stand ahead of handle 22 in a more centered position and would not need to rotate his or her right arm about the shoulder but could let his or her right arm hang naturally. The operator would then be able to grip the right hand grips of handle 22, OPC bail 54, and aeration bail 56 using the operator's right hand in much the fashion as described above except the fingers of the operator's right hand will now be curled around the topside of the handle. While the operator's thumb of his or her right hand would still be received naturally in notch 34 of right thumb wheel 32r of traction control 28, at least the index finger of the operator's right hand could also now be used to push on the various walls 36b and 36f of notch 34. With the operator so located and when the operator pushes rearwardly/downwardly with the thumb and/or index finger of his or her right hand, the operator's thumb and/or index finger will push on the back wall 36b of notch 34 to rotate thumb wheel 32r and traction control 28 rearwardly/downwardly to initiate reverse motion of aerator 2 for so long as the operator keeps pressure on thumb wheel 32r.

Obviously, an operator who is left handed will have the same ease of use of the controls as described above except that such an operator will most likely manipulate the left hand grips of handle 22, OPC bail 54, and aeration bail 56 to allow the thumb and/or index finger of the operator's left hand to be used against front and back walls 36f, 36b of notch 34 of the left thumb wheel 32l.

FIG. 8 depicts an alternative form of handle 22, traction control 28, OPC bail 54 and aeration bail 56 which may be used in place of their counterparts as depicted in FIGS. 4-7. In referencing the relevant changes in the components shown in FIG. 8, the same reference numbers used for the corresponding components of FIGS. 4-7 will be used with a prime designation being added to the reference number. Thus, handle 22 in FIG. 8 will be identified as 22', OPC bail 54 as 54', and so on. In addition, only the relevant differences between the components will be described with the components otherwise being substantially identical in other respects to the corresponding components in FIGS. 4-7 unless otherwise noted herein.

As shown in FIG. 8, handle 22' is no longer C-shaped but has a generally closed loop shape with the middle of the front side of handle 22' being closed by a rearwardly and downwardly extending U-shaped section 23 having a rearwardly extending bracket 25. Bracket 25 allows handle 22' to be secured at the front thereof to control console 20 in addition to the securement provided by attaching the closed rear side of handle 22' to control console 20. In addition, section 23 also provides additional strength and stability to handle 22'. This allows handle 22' to more readily withstand the forces the operator applies to handle 22' keeping in mind that handle 22' is the structure by which the operator swings handle assembly 10 from side-to-side to steer frame 4.

As further shown in FIG. 8 with respect to thumb wheel 32l', the laterally outer side of thumb wheel 32l' has a rim 33 with a convex cross-section which overlaps, i.e. is closely spaced above or in slight contact with, a generally matching convexly shaped radius 35 in handle 22' at the junction between hand grip 24l' of handle 22' and the top of the adjacent side of U-shaped section 23 of handle 22'. The same geometry is present for the other thumb wheel 32r' and the top of the other side of U-shaped section 23 of handle 22'. Thus, thumb wheels 32l' and 32r' are effectively rotatably supported on their laterally outer sides by the close spacing or slight contact between the overlapping convex rims 33 in thumb wheels 32l' and 32r' and the convex radii 35 in hand grips 24l' and 24r'. In addition, thumb wheels 32l' and 32r' are rotatably supported at their inner sides by opposite ends of shaft 30 that journals thumb wheels 32l' and 32r' in control console 30 in the manner taught in FIGS. 4-7. Both the inner side support provided by shaft 30 and the outer side support provided by overlapping the outer sides of the thumb wheels 32l' and 32r' with the radii 35 helps maintain alignment of thumb wheels 32l' and 32r' on hand grips 24l' and 24r' and helps ensure smooth rotation of thumb wheels 32l' and 32r' on handle 22'.

Referring still further to FIG. 8, the top sides of each of the left and right hand grips 24l' and 24r' and adjacent rearward portions of the left and right sides of handle 22' have an upwardly facing concave channel 27 in a reduced diameter portion of handle 22'. A similar shallow, downwardly facing channel (hidden in FIG. 8) is provided in the bottom sides of each of the left and right hand grips 24l' and 24r' and adjacent rearward portions of the left and right sides of handle 22'. The upwardly and downwardly facing channels 27 are designed to mate with corresponding portions of OPC bail 54' and aeration bail 56' so that at least a portion of the bail diameters nest within channels 27 when the bails 54' and 56' are closed against hand grips 24l' and 24r'. This makes it easier for the operator to hold both bails 54' and 56' against handle 22' by reducing the combined thickness the operator is required to grip when one or more of the bails 54' and 56' is closed against handle 22'.

FIGS. 9A and 9B respectively depict the thumb wheel 32l from the embodiment of FIGS. 4-7 and the corresponding thumb wheel 32l' from the embodiment of FIG. 8. Thumb wheel 32l' as shown in FIG. 9B has a notch 34' in which the sloped front and back walls 36f', 36b' thereof are substantially flatter than their counterparts 36f and 36b in thumb wheel 32l shown in FIG. 9A. In addition, the sloped front and back walls 36f', 36b' of thumb wheel 32l' are positioned higher on thumb wheel 32l' as shown in FIG. 9B than their counterparts 36f and 36b in thumb wheel 32l shown in FIG. 9A. The Applicants have found the configuration of FIG. 9B with the substantially flat and somewhat higher front and back walls 36f', 36b' to be more comfortable to operate than the configuration of FIG. 9A. Thus, many alternatives in the configuration of the notch 34 or 34' in the thumb wheels 321 and 32r or 321' and 32r' are possible including one in which there is no notch at all with the front and back walls thereof simply comprising front and back portions of a substantially planar, upwardly facing paddle.

Various other modifications of the operational controls will be apparent to those skilled in the art. For example, OPC bail 54 may be dispensed with in some embodiments of this invention. Moreover, left and right bail grips of the OPC bail 54 and aeration bail 56 may be separately rotatable from one another in the manner of individual bails rather than forming opposite ends of a single bail.

The Operational Sensors

Referring now to FIG. 2, aerator 2 is shown from the rear with the cover of tine head 14 removed to show tine assemblies A-F that create the aeration holes in the turf surface. There are six side-by-side tine assemblies A-F disposed across the width of tine head 14. Each tine assembly has a stomper arm 74 whose upper end is rotatably journalled on a laterally extending, rotatable crankshaft 76 journalled in tine head 14. The lower end of each stomper arm 74 is operatively connected to a tine holder 78 which mounts a plurality of aeration tines 80, e.g. three tines, for creating aeration holes in the turf surface. The number of tine assemblies A-F and/or the number of tines 80 carried in each tine assembly can obviously vary.

Each tine assembly A-F is vertically reciprocated upwardly and downwardly in repeating cycles by crankshaft 76 with tines 80 carried by each tine assembly being driven into the turf surface to create aeration holes and then being withdrawn from the turf surface in each cycle of operation. The outermost tine assemblies A and F, the innermost tine assemblies C and D, and the intermediate tine assemblies B and E are grouped together in pairs with the tine assemblies in each pair A and F, B and E, and C and D being driven upwardly and downwardly in synchronism with one another by crankshaft 76. However, the different tine assembly pairs rotate 120° out of phase relative to one another. Tines 80 carried in tine assemblies A-F extend downwardly through slots in various turf guards 18 which pivot on frame 4 of tine head 14 to follow changes in ground contour.

Figure 10:
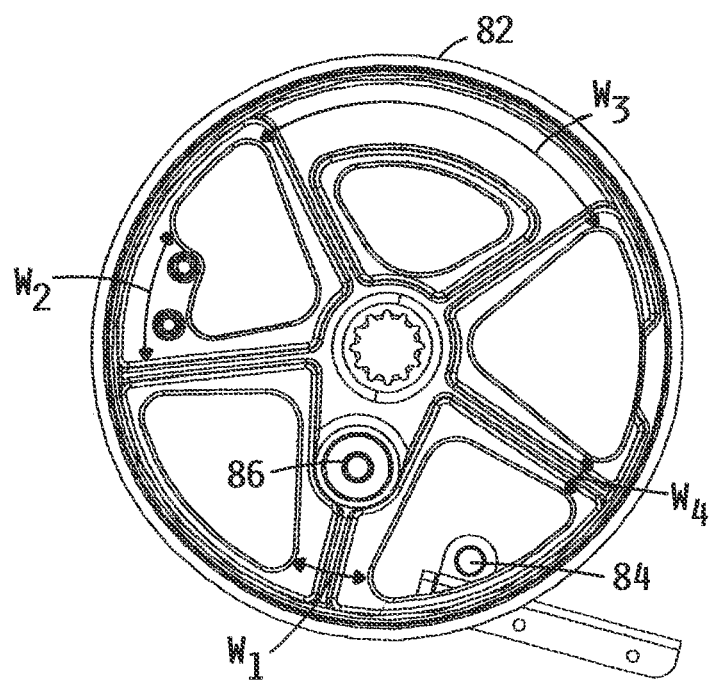
FIG. 10 is a side elevational view of a tine head drive pulley and an adjacent sensor which determines the speed of rotation and the position of the tine assemblies contained in the tine head.

Referring now to FIGS. 2 and 10, a belt driven, cast iron pulley 82 having magnetic properties rotates crankshaft 76. As best shown in FIG. 10, a tine assembly speed and position sensor 84, preferably a Hall Effect sensor, is positioned along a circumference of an imaginary circle having a diameter slightly less than the diameter of pulley 82. Pulley 82 has webs $W_1$, $W_2$, $W_3$, and $W_4$ of different widths along the circumference of the imaginary circle. Sensor 84 reads the different web widths as pulses of different lengths. This allows the control system to use the output of sensor 84 to determine the operator chosen speed of rotation of crankshaft 76 and thus the rotational speed of tine assemblies A-F. Crankshaft 76 speed may be set to a desired speed by the operator by using a throttle control to set the speed of prime mover 12 since the rotational speed of tine assemblies A-F varies directly with prime mover speed given the use of a mechanical power train to drive tine assemblies A-F from prime mover 12.

In addition, the output of sensor 84 can be used for another purpose. The web $W_1$ of pulley 82 has a journal 86 to which stomper arm 74 of tine assembly F is attached. This allows the control system to determine where tine assembly F and its paired tine assembly A are within their paired orbits of rotation within tine head 14 whenever the pulse associated with web $W_1$ is detected by sensor 84 and reported to the control system. Since the control system is aware that the other tine assembly pair B and E as well as tine assembly pair C and D are offset at 120° intervals from pair A and F, the location of the other pairs within tine head 14 can be extrapolated from the position detected for pair A and F. Thus, the information provided by sensor 84 to the control system allows not only for a determination of the rotational speed of tine assemblies A-F within tine head 14 but the location or position of tine assemblies A-F within tine head 14. This information is used by the control system as will be described in more detail hereafter.

Referring now to FIG. 3, tine head 14 is shown separated from the rest of aerator 2 with an upper cover removed for the sake of clarity. Tine head 14 is mounted to frame 4 for vertical movement relative to frame 4 by two laterally spaced and substantially identical four bar linkages 88. Each four bar linkage 88 comprises an upper link 90 and a lower link comprising one side 92 of a unitary lower frame 94. The upper and lower links 90, 92 have front ends which pivot on tine head 14 about the laterally extending horizontal pivot axes $X_3$ and $X_4$. The rear ends of the upper and lower links 90, 92 pivot about the laterally extending horizontal pivot axes $X_5$ and $X_6$ in FIG. 3 on frame 4 of aerator 2 with the rest of aerator 2 not being shown in FIG. 3 for the sake of clarity.

An actuator of any suitable type, such as a hydraulic cylinder 96, is pivotally connected between tine head 14 and frame 4. Tine head 14 is lifted upwardly when pressurized fluid is admitted into cylinder 96 to extend the piston rod out of cylinder 96. Conversely, tine head 14 is lowered by the force of gravity, which may be assisted by one or more return springs 98, when the pressurized fluid is released from or ported out of cylinder 96. Tine head 14 swings in a slight arc as tine head 14 lifts and lowers as determined by the geometry of the four bar linkages 88, 88. The mounting of tine head 14 as just described is the same as that employed in the Applicant's existing ProCore 648® aerators.

Figure 11:
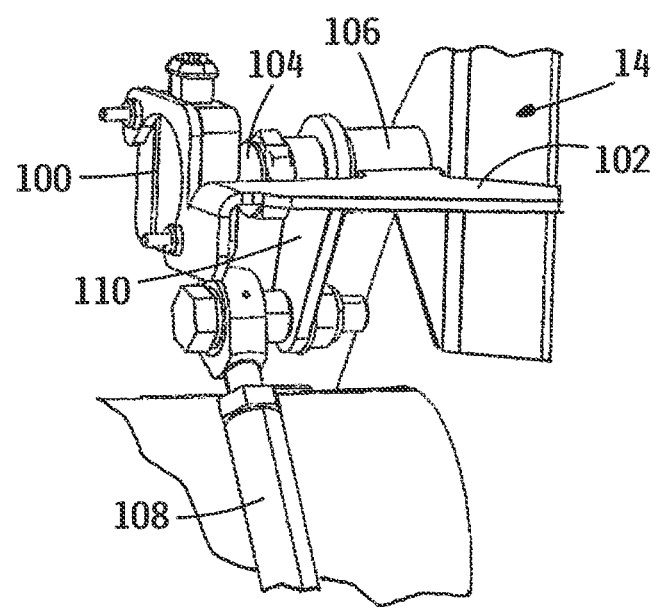
FIG. 11 is a front perspective view of a sensor for determining the vertical position of the tine head relative to the frame.

What is different about tine head 14 of this invention is the use of a height sensor 100 to determine the height of tine head 14 relative to frame 4 of aerator 2. Referring now to FIG. 11, height sensor 100 is preferably, but not necessarily, a Hall Effect sensor that is fixed by a bracket 102 to an upper portion of tine head 14. A rotatable magnet 104 is rotatable within a hub 106 that is also fixed to tine head 14 such that magnet 104 is adjacent to height sensor 100. An upper end of a tie rod 108 is coupled by a flange 110 to magnet 104 as shown in FIG. 11 while the lower end of tie rod 108 is coupled to lower frame 94 that contains the lower links 92, 92 of the four bar linkages 88, 88 as shown in FIG. 3.

During vertical motion of tine head 14 relative to frame 4 and relative to the turf surface, tie rod 108 rotates magnet 104 relative to height sensor 100 to vary the voltage output of the sensor in accordance with the height of tine head 14. Height sensor 100 is calibrated without tines 80 installed in tine assemblies A-F to provide voltage readings at the highest level of tine head 14 at full extension of cylinder 96 and at the lowest level of tine head 14 when turf guards 18 of tine head 14 are in contact with a level turf surface. If the range between these voltages is within expected tolerances, this range is used by the control system as indicators of a fully raised tine head and a fully lowered tine head. The actual height of tine head 14 relative to frame 4 is thus determined at any moment in time by comparing the voltage being output by height sensor 100 to the reference voltage range stored in the control system.

Referring further to FIG. 3, a ground contour sensor 112 of the same type as tine head height sensor 100, namely a Hall Effect sensor and an adjacent rotatable magnet, is carried within tine head 14. A tie rod 114 links at least one pivotal turf guard 18 to the rotatable magnet portion of ground height sensor 112 such that sensor 112 reads changes in ground contour as aerator 2 moves over the turf surface being operated. Such ground contour readings are used to automatically adjust the vertical position of tine head 14 during operation of aerator 2 to maintain a selected hole depth as the ground contour changes. This is accomplished in substantially the manner described in the '969 patent incorporated by reference herein except that ground contour sensor 112 as disclosed herein provides finer readings of ground contour changes than was true of the sensor system disclosed the '969 patent.

Finally, a sensor 116 is also provided to determine the ground speed of aerator 2. In one embodiment, ground speed sensor 116 is associated with the motor driving front wheel 8.

The description of specific types of sensors above is not limiting. Any sensor or sensors capable of sensing and reporting the same type of sensed information could be used in place of the sensors described earlier.

The Hydraulic System Modifications

Before discussing the operation of aerator 2, various modifications were made to the hydraulic system of the Applicant's prior art ProCore® 648 aerator to facilitate the operation of certain new features of aerator 2 of the present invention. These modifications are depicted in FIGS. 12 and 13.

Figure 12:
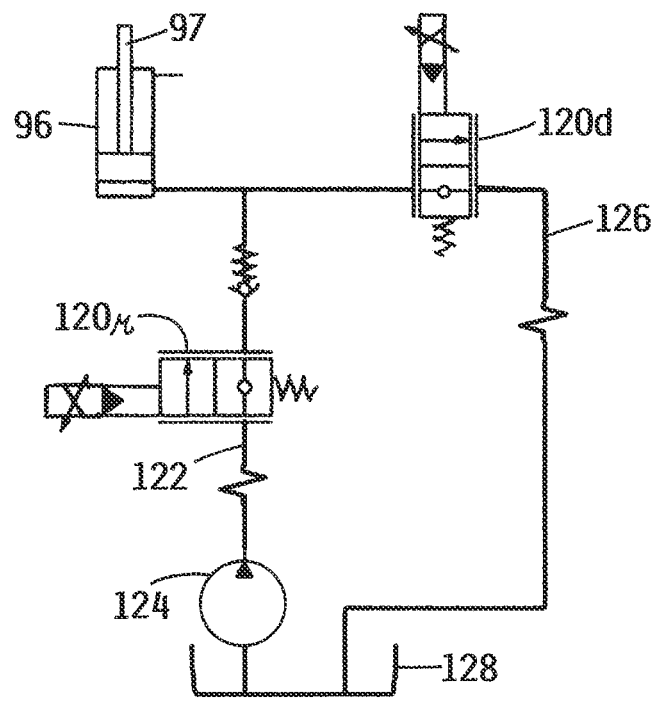
FIG. 12 is a simplified and partial schematic of a portion of the hydraulic system of the aerator of FIG. 1, particularly showing only portions of the hydraulic fluid circuit to the hydraulic cylinder that lifts and lowers the tine head of the aerator.
Figure 13:
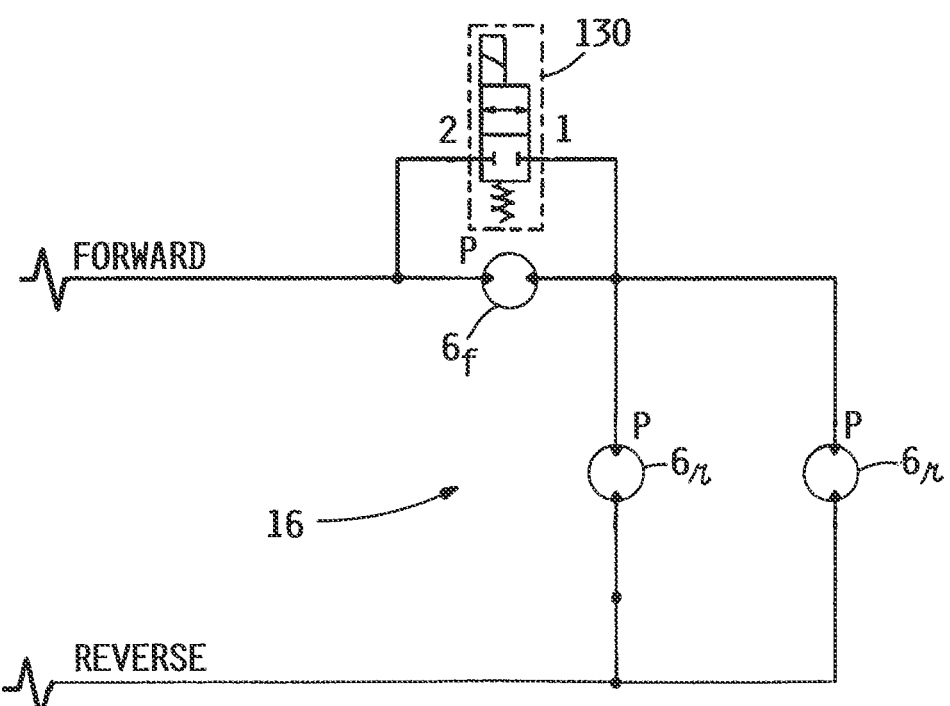
FIG. 13 is a simplified and partial schematic of a portion of the hydraulic system of the aerator of FIG. 1, particularly showing only portions of the hydraulic fluid circuit to the hydraulic traction drive of the aerator.

FIG. 12 depicts an improvement in how pressurized hydraulic fluid is provided by the hydraulic system to cylinder 96 to raise and to drop tine head 14. A first proportional control valve 120r is inserted into the fluid supply line 122 that provides pressurized hydraulic fluid from a lift and lower pump 124 to cylinder 96. When valve 120r is selectively actuated by a controller 118 described in the following section of this application, fluid from pump 124 is ported into cylinder 96 to a varying degree determined by how far valve 120r is opened to extend piston rod 97 out of cylinder 96 to raise tine head 14 relative to frame 4 of aerator 2. A second proportional control valve 120d is inserted into the fluid return line 126 to permit the pressurized fluid within cylinder 96 to exit cylinder 96 to allow piston rod 97 to retract to drop tine head 14 and to return such fluid to a hydraulic fluid reservoir 128 associated with pump 122.

The use of a single proportional control valve 120d in the return flow between cylinder 96 and reservoir 128 provides a greatly reduced pressure drop as compared to the Pro-Core® 648 aerator in which the return flow was routed through three control valves as it returned to the reservoir. Accordingly, when control valve 120d is fully opened, the hydraulic fluid within cylinder 96 can more quickly return to reservoir 128. This allows tine head 14 to more quickly drop from a fully raised, non-operational position thereof to a fully lowered, operational position. This increase in drop speed helps facilitate the targeted drop and/or tufting reduction features of this invention to be described in the following section of this application, namely a drop designed to cause tine head 14 engage the turf surface and begin aerating at a location targeted by the operator and to cause tine head 14 to engage the turf surface in a manner that minimizes tufting.

In addition to the use of a single control valve 120d in fluid return line 126, the drop speed of tine head 14 can desirably be further increased by increasing the size of the passages in the fluid return line 126 as compared to what was previously used in the hydraulic system of the ProCore® 648 aerator. Fluid return line 126 comprises a plurality of passageways in a valve manifold which can be drilled out to larger diameters as compared to their usual size. For example, certain passageways having a diameter of 0.250 inches in the corresponding valve manifold of the ProCore® 648 aerator have been drilled out to a size of 0.375 inches over a total passageway length of approximately 12 inches. This together with the aforesaid use of just a single control valve 120d in fluid return line 126 allows tine head 14 of this invention to have an initial drop rate of approximately 24 inches per second compared to an initial drop rate of the tine head in the prior art ProCore® 648 aerator of approximately 17 inches per second, comprising approximately a 40% increase in the initial drop rate of tine head 14 of aerator 2 of this invention.

Turning now to FIG. 13, aerator 2 of this invention has an all-wheel hydraulic traction drive 16 in which the motors 6r, 6r driving rear wheels 6, 6 are connected in parallel with one another but in series with the motor 6f driving front wheel 8. This is the same hydraulic traction drive as used in the prior art ProCore® 648 aerator. However, in aerator of this invention, an electrically operated, on-off bypass valve 130 is used in the fluid supply line 132 to selectively bypass the hydraulic flow around motor 6f driving front wheel 8 to permit front wheel 8 to free wheel during a turnaround operation at the end of one aeration pass prior to beginning the next aeration pass. The reasons for this will be described in more detail in the following section of this application.

The Operation of the Aerator

In aerator 2 of this invention, tine head 14 is at the rear end of frame 4 while the operator is at the front end of frame 4. This is desirable since the operator does not walk on and thus crush any of the cores left on the turf surface when hollow coring tines rather than solid tines are used in tine assemblies A-F of tine head 14. However, when aerating a turf surface having different types of turf surfaces separated by boundaries, such as, but not limited to, a golf course green having a fine turf surface mowed to very low heights of cut surrounded by a collar having a coarser turf surface mowed to higher heights of cut, it is desirable to aerate only the green and not the collar for the reasons set forth in the Background of the Invention section hereof.

This requires the operator to manually time the moment he or she begins the rotation of tine assemblies A-F and initiates dropping tine head 14 into engagement with the green at the beginning of each pass of aerator 2 across the turf surface to miss the collar but start aerating the green just inside the boundary between the two. Such precision is also needed at the end of the pass to allow tine head 14 to aerate the green right up to the opposite boundary while lifting tine head 14 up at just the right time to avoid aerating the collar. Given that many passes are needed to aerate a single green and many greens may need to be aerated in a single day, the burden on the operator can be tiring and such precision is difficult to maintain. Less skilled or inexperienced operators may be incapable of applying the requisite precision to the task at hand. Nonetheless, an operator may still select the above described mode of operation of aerator 2, i.e., by using mode control switch 64 to select the immediate drop mode of operation, if the operator prefers this mode or if aerator 2 is being used to aerate a turf surface which is less demanding.

Figure 18:
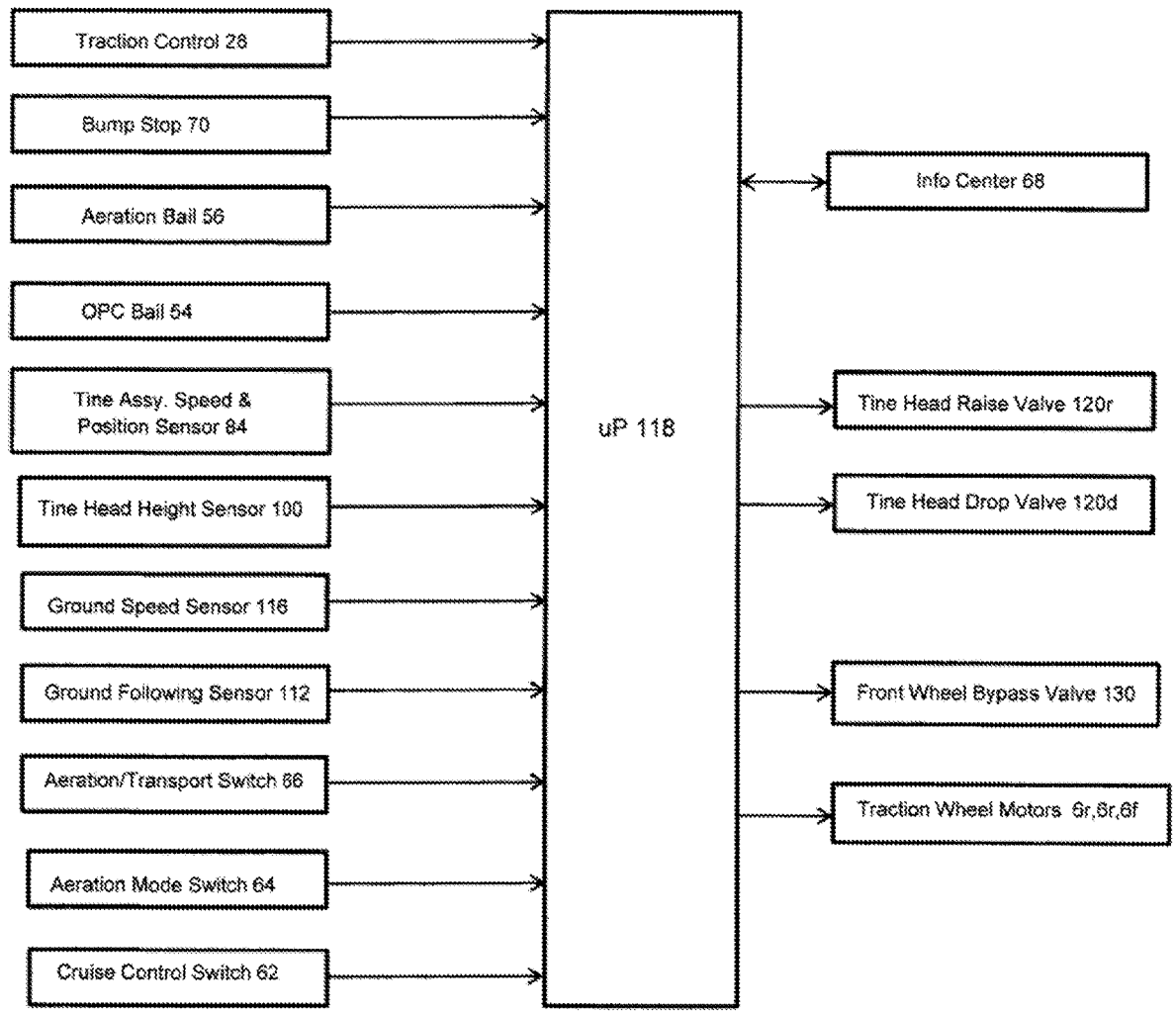
FIG. 18 is a simplified schematic view of the control system for operating the aerator of FIG. 1.

However, mode control switch 64 also allows the operator to select the delayed drop mode of operation in which a microprocessor based electronic controller 118 schematically depicted in FIG. 18 takes over the lowering and the lifting decisions at the beginning and end of each pass of aerator 2 across the green. In a first aspect of this invention in the delayed drop mode, controller 118 and control methods of this invention allow the operator to electronically target a location on the green where the operator wishes aeration to begin at the start of each pass. When this targeted start location is received by controller 118 and with tine head 14 lifted into a standard transport height, controller 118 begins rotation of tine assemblies A-F in tine head 14 and then releases tine head 14 for dropping at a moment in time that is determined by controller 118 to allow tine head 14 to reach its fully lowered height and to begin aerating the turf surface at substantially the start location targeted by the operator. If so desired, the release of tine head 14 by controller 118 is additionally adjusted from pass to pass to take into account operational variability in the drop rate of tine head 14. In a second aspect of this invention in the delayed drop mode, the timed release of tine head 14 by controller 118 may be further adjusted to cause the first pair of tine assemblies that enter the turf surface to substantially penetrate to the full desired hole depth to minimize any tufting of the green.

At the end of each pass of aerator 2 across the green, the first aspect of the invention further allows the operator to electronically target a location on the green where the operator wishes aeration to end at the end of each pass. When this targeted end location is received by controller 118, controller 118 then lifts tine head 14 at a moment in time that is determined by controller 118 to allow tine assemblies A-F in tine head 14 lift up out of the turf surface at substantially the end location targeted by the operator. Controller 118 then turns tine assemblies A-F off after they are clear of the turf surface as tine head 14 is lifted to the standard transport height. While the first and second aspects of the invention are preferably combined in controller 118 and the control methods of this invention for use together in the delayed drop mode of operation, they may be used separately from one another in an aerator if so desired.

During the delayed drop mode of aeration, the operator may enable the cruise control function by selecting the on position of the cruise control switch. While the cruise control function is operable in the transport mode as described above, it functions differently in the transport mode than in the delayed drop mode of aeration. The cruise control system is not available for use in the immediate drop mode of aeration.

Assume now that the delayed drop mode of aeration has been selected and that cruise control has been enabled. As explained in more detail hereafter, the targeted start and end locations of each aeration pass across the turf surface may be set in the delayed drop mode of aeration by the operator by closing aeration bail 56 against handle 22 and by releasing aeration bail 56 from handle 22, respectively. After the first closing of bail 56 against handle 22 at the beginning of the first pass and with cruise control enabled, the ground speed determined by controller 118 to be the ground speed which achieves the selected fore-and-aft hole spacing at the existing constant rotational speed of the tine assemblies will be set by controller 118 as the cruise control speed. Thus, during each aeration pass across the turf surface and during turnaround operations between successive passes, controller 118 will automatically and continuously maintain the cruise control speed that it had set to achieve whatever selected fore-and-aft hole spacing had been preset by the operator or supervisor and stored in controller 118 prior to the start of the aeration job. This electronic and automatic continuous control of ground speed of frame 4 of aerator 2 by electronic controller 118 using the cruise control function to achieve a desired hole spacing is an advance in the aerator art.

At the end of the each aeration pass when the user releases aeration bail 56, the control of the ground speed remains with the cruise control system in the delayed drop mode of aeration if such system was engaged. The controller will maintain the cruise control speed during a turnaround operation in which the operator lines up aerator 2 for a second pass in the opposite direction if the operator does nothing more. However, some operators may desire to use a faster turnaround speed than the normally slower cruise control speed during a turnaround. Accordingly, the user can temporarily use traction control 28 to speed aerator 2 up from the cruise control speed during a turnaround by advancing traction control 28 to achieve a higher ground speed than the cruise control speed. When the turnaround is complete and the operator simply releases traction control 28 to allow traction control 28 to return to neutral as aerator 2 approaches the start of the next aeration pass, controller 118 resumes using the cruise control speed to achieve the selected hole spacing in the next pass.

Referring now to FIG. 13, during each turnaround operation between successive aeration passes, controller 118 will actuate bypass valve 130 such that hydraulic flow to front wheel 130 bypasses the hydraulic motor driving front wheel 8 to allow front wheel 8 to freewheel. During such a turnaround, aerator 2 is then only driven by rear wheels 6. This allows the operator to turn around sharply without having front wheel 8 scrub the turf surface on the collar of the green. While the collar has a turf surface that may not be as fine or closely mowed as the turf surface on the green, the turf surface on the collar is often itself mowed to very low heights and is fine enough to be susceptible to wheel damage. Letting front wheel 130 freewheel during turnarounds on the collar lessens the possibility of damaging the collar even when the operator turns front wheel 8 sharply to effect a tight turn.

The functioning of the traction control/cruise control system in the delayed drop mode of aeration during each subsequent pass of aerator 2 across the green remains the same as described above unless the cruise control system is positively disengaged by the operator. This positive disengagement can be done in one of four different ways: 1.) by positively tapping or moving traction control 28 rearwardly, 2.) by releasing OPC bail 54, 3.) by setting cruise control switch 62 to off, or 4.) by engaging or hitting bump stop 70.

There are a number of parameters that must be preset in controller 118 for a particular aeration job. As previously noted, one parameter is the desired fore and aft spacing for the aeration holes being created by tine assemblies A-F. Another parameter is the desired depth of the aeration holes. These parameters may have different values selected for the aeration job by the operator, a supervisor, or the like. These parameters are input into controller 118 using Info Center 68 and a menu driven parameter selection process.

Tines of different lengths may be used in tine assemblies A-F of tine head 14. In one embodiment of this invention, there is no direct input into Info Center 68 to enter and store the length of the particular tines being used in the aeration job. In this embodiment, there is a calibration procedure which is performed before starting the aeration job that accounts for the length of tines 80 installed in tine assemblies A-F for purposes to be described hereafter.

The calibration procedure begins with aerator 2 positioned on a level surface, with tine head 14 in a raised position, and with tines having a selected length installed in tine assemblies A-F. To perform the tine length calibration in one embodiment thereof, the operator will first remove the upper cover of tine head 14. Then, the operator will manually rotate pulley 82 in tine head 14 until the outermost pair A and F of tine assemblies are the lowest pair at bottom dead center relative to crankshaft 76. Any pair of tine assemblies could be chosen for use in the calibration procedure, but one tine assembly A or F in the outermost pair A and F should be the most easily visible to the operator. The operator will then slowly lower tine head 14 until tines 80 in tine assemblies A and F just touch the ground with the tips of tines 80 and ground engaging wheels 6 and 8 establishing an imaginary ground plane. With tine head 14 stopped in this position, the operator will then click a button on Info Center 68 or some other control to obtain a reading from height sensor 100 of the height of tine head 14 relative to frame 4 of aerator 2 when tines 80 are touching the imaginary ground plane and to store this reading in controller 118.

When operating in the delayed drop mode, the operator targets the aeration start location by closing aeration bail 56 against handle 22 when a selected reference feature on aerator 2 reaches the desired aeration start location. In one embodiment, the selected reference feature is the line where the front of front wheel 8 contacts the turf surface. Other points or spots on aerator 2 could be used as the reference feature, but where the front of front wheel 8 contacts the turf surface is readily visible to the operator who is standing adjacent front wheel 8. The fore-and-aft distance between the reference feature and the bottom dead center position of tine assemblies A-F in the fully lowered position of tine head 14 is a fixed reference distance, known as the delay distance, which is stored in controller 118.

As the operator and aerator 2 near the boundary between the collar and the green of the golf course prior to beginning an aeration pass, the operator can look down and observe when the reference feature crosses over the boundary. The operator need only close aeration bail 56 against handle 22 when this visual observation is made by the operator. The moment when the operator chooses to close aeration bail 56 is up to the operator. However, in order to maximize the aerated area of the green without leaving portions of the green unaerated, the operator would be expected to close the bail as soon as he or she observes the reference feature passing over the collar of the green and onto the green. It is this manual closure of aeration bail 56 that establishes the targeted location at which aeration is to start.

Upon closure of aeration bail 56 and with tine head 14 disposed at the standard transport height relative to the turf surface, controller 118 then substantially immediately begins the rotation of tine assemblies A-F by engaging the clutch in the mechanical drive train to tine assemblies A-F. Controller 118 also sets or adjusts the ground speed of aerator 2 to the speed necessary for achieving the desired hole spacing as preset in controller 118. However, controller 118 does not immediately lower tine head 14 as would have occurred in the immediate aeration mode.

Instead, controller 118 uses the ground speed of aerator 2 and the stored delay distance to monitor and determine the distance traveled by aerator 2 after closure of aeration bail 56. A parameter known as the nominal drop rate comprises a fixed rate at which tine head 14 will lower under the influence of gravity, including the assistance of one or more return springs 98 if such springs are provided, after fluid pressure holding tine head 14 in its raised position is released from cylinder 96. The nominal drop rate is stored within controller 118. Using the real time distance traveled after closure of aeration bail 56, the nominal drop rate, and the delay distance, controller 118 automatically releases the fluid pressure from cylinder 96 at a calculated distance before the end of the delay distance to permit tine head 14 to lower and to contact and begin aerating the turf surface approximately at the targeted aeration start location, e.g. within approximately plus or minus ⅔ of the desired hole spacing although this tolerance may be increased if so desired.

At the end of a pass across the turf surface, the operator targets the desired aeration end location by manually releasing aeration bail 56 from contact with handle 22 when the reference feature reaches the location at which the operator wishes aeration to end. Using the real time distance traveled after release of aeration bail 56, a fixed lift rate, and the delay distance, controller 118 automatically applies fluid pressure to cylinder 96 to lift tine head 14 clear of the turf surface and to stop aerating the turf surface approximately at the targeted aeration end location. The fixed drop and lift rates at which tine head 14 is lowered and lifted, respectively, may be different from one another to account for the different lower and lift characteristics of cylinder 96.

In some circumstances during a pass of the aerator across the turf surface, an operator may wish to quickly raise and lower tine head 14 without turning off the rotation of tine assemblies A-F in order for tine head 14 to hop or jump over some object embedded in the green of the golf course, such as a sprinkler head, a sprinkler system control box, or the cup on the green, to avoid potentially striking and damaging the object. The operator can do this by opening aeration bail 56 when the reference feature on aerator 2, e.g. front wheel 8 as described earlier, first reaches the object and by then quickly reclosing aeration bail 56 when the reference feature on aerator 2 has passed the object. If controller 118 determines that aerator 2 will travel a distance between these two actions by the operator which is less than the delay distance, controller 118 will store the locations marked by the release and then the subsequent closure of the bail by the operator as additional targeted start and end object avoidance locations. Without turning off the rotation of tine assemblies A-F, controller 118 will then automatically lift tine head 14 when the targeted start object avoidance location is reached and then automatically lower tine head 14 when the targeted end object avoidance location is reached without otherwise interrupting the current pass.

Whether or not the automatic control for avoiding objects on the turf surface including the establishment of targeted start and end object avoidance locations is used as part of the first aspect of this invention, the first aspect of the invention involving the establishment of targeted start and end locations for each pass of aerator 2 across a turf surface and the automatic control of the lowering and lifting, respectively, of tine head 14 at such locations may be used by itself. However, the performance of the first aspect of the invention can be additionally improved if so desired through an adaptive iterative adjustment of the nominal drop rate used by controller 118 during operation of aerator 2 to account for variability that occurs over time in the drop rate. For example, the nominal drop rate is calculated using a predetermined nominal reference temperature of the hydraulic fluid in cylinder 96. However, the actual hydraulic fluid temperature in cylinder 96 during aeration will vary from the nominal temperature as the hydraulic fluid typically heats up when aerator 2 is operating. This variance changes the actual drop rate of tine head 14 from the nominal drop rate stored in controller 118.

Controller 118 uses readings from tine head height sensor 100 to correct for variances between the actual drop rate and the nominal drop rate of tine head 14. At the beginning of each pass and after tine head 14 has been released for dropping by controller 118 in order to lower to the fully lowered position, controller 118 will read the actual tine head height from tine head height sensor 100 when tine head 14 should be in its fully lowered position at the targeted aeration start location to the nominal height it should have had. If the drop rate had been accurate, the two height readings should be the same.

However, if there is a variance between the two, e.g., the actual height reading was above the nominal reading, controller 118 appropriately adjusts the drop rate for use in the next pass in an attempt to eliminate the variance. This iterative adjustment will continue from pass to pass to match the drop rate used by the control system in its calculations to the actual drop rate as closely as possible. This will improve the accuracy of tine head 14 hitting the targeted aeration start location, e.g. to approximately plus or minus ⅓ of the desired hole spacing although this tolerance may be increased if so desired.

The second part of the second aspect of this invention is a further adjustment by controller 118 concerning the moment in time at which controller 118 releases tine head 14 for dropping in order to hit the targeted aeration start location. This further improvement is concerned with reducing tufting. It is based on the inventors' discovery that the first pair of tine assemblies that enter the ground will do so at an angle that allows tines 80 in the first pair of tine assemblies to drive into the turf surface to the full desired hole depth when the tips of tines 80 in the immediately preceding pair of tine assemblies are slightly above or brush against the top of the turf surface without forming aeration holes. This condition for the preceding pair of tine assemblies was established in the tine length calibration procedure described earlier herein with controller 118 reading and storing the height of tine head 14 relative to frame 4 when tines 80 in a tine assembly just touch the turf surface without forming aeration holes in the turf surface.

However, in order to provide this tufting elimination feature, controller 118 must know the rotational speed of tine assemblies A-F as well as the positions of tine assemblies A-F within tine head 14. This information is provided to controller 118 by the tine assembly speed and position sensor 84. Using this information, controller 118 can further identify an entry pair of tine assemblies comprising the first pair to enter the turf surface and which pair of tine assemblies will be the preceding pair of tine assemblies taken with respect to the direction of rotation of tine assemblies A-F. Thus, in making its decision as to when to release tine head 14 for dropping in order to hit the targeted aeration start location, controller 118 can adjust the time of release as need be in a manner that causes one pair of tine assemblies (the preceding pair above) to be located at the tine head height established during the tine length calibration procedure such that the next pair of tine assemblies (the entry pair) will enter the turf surface and begin aerating without causing tufting.

The tufting elimination feature could be used on aerator 2 without necessarily using any other of the described aspects of the invention set forth herein. For example, in an aerator having only an immediate drop mode of aeration such as the existing ProCore 648® aerator, it would be an advantage to have a controller that would delay the immediacy of the drop to achieve the tine assembly positioning described above that eliminates tufting. This would still require the presence of tine head height sensor 100 and tine assembly speed and position sensor 84. It would also require that controller 118, tine assemblies A-F, and the traction drive have enough time to get up to speed and stabilize and to calculate the correct positions prior to dropping tine head 14. If tine assemblies A-F were able to get up to speed quickly enough, the traction drive was paused or slowed until tine assemblies A-F were up to speed, and the software in controller 118 had sufficient time to calculate when to release tine head 14 for dropping, the tufting improvement feature could be used in an aerator without the targeting feature.

The ability of aerator 2 to achieve the targeted drop and/or the tufting reduction described above is facilitated by the increase in the drop speed of tine head 14 provided by the hydraulic system modifications described earlier with respect to return valve 120d and fluid return line 126 shown in FIG. 12. When controller 118 calculates the moment needed to drop tine head 14, it makes such this decision based on the faster drop rate provided by the aforesaid hydraulic system modifications. When that moment arrives, controller 118 immediately substantially fully opens valve 120d to permit the fluid to leave cylinder 96 as quickly as possible. The decrease in the time required for tine head 14 to reach the turf surface helps ensure there is enough time for tine head 14 to reach the turf surface at the targeted start aeration location. In addition, the extra speed with which tine head 14 drops will help the tines in whatever tine assembly is first to reach the turf surface to engage the turf surface with more force to drive into the turf surface more quickly and deeper. This aids in achieving the tufting improvement objective.

Finally, it should be noted that both supply valve 120f and return valve 120d can also be controlled by controller 118 in a proportional manner in response to changes in ground contour detected by ground contour sensor 112. This proportional control allows controller 118 to make slight adjustments in the elevation of tine head 14 during an aeration pass to lift tine head 14 upwardly relative to frame 4 to accommodate rises in the ground contour of the turf surface or to lower tine head 14 downwardly relative to frame 4 to follow dips in the ground contour.

While some aspects of this invention are particularly useful in demanding applications such as a golf green surrounded by a collar, aerator 2 obviously may be used on many other turf surfaces. Aerator 2 may be used in sports fields, parks, lawns, and any other areas where a turf surface would benefit from aeration. The targeted aeration feature of this invention, i.e. the ability of the operator to establish targeted aeration start and aeration end locations allows for improved operator awareness of the surroundings. This awareness particularly improves aerator operation in "tight quarter" applications and eases the training of operators. Moreover, the ability to establish targeted start and end object avoidance locations within an aeration pass makes obstacle avoidance on any turf surface far easier as the operator no longer has to guess at the location of the obstacle when it is hidden under the frame of the aerator and cannot be viewed from the operator position. Aerator 2 allows the obstacle to be targeted when the operator approaches the obstacle and passes the obstacle at a time when the operator is right next to the obstacle.

The Adjustable Handle Assembly

Figure 14:
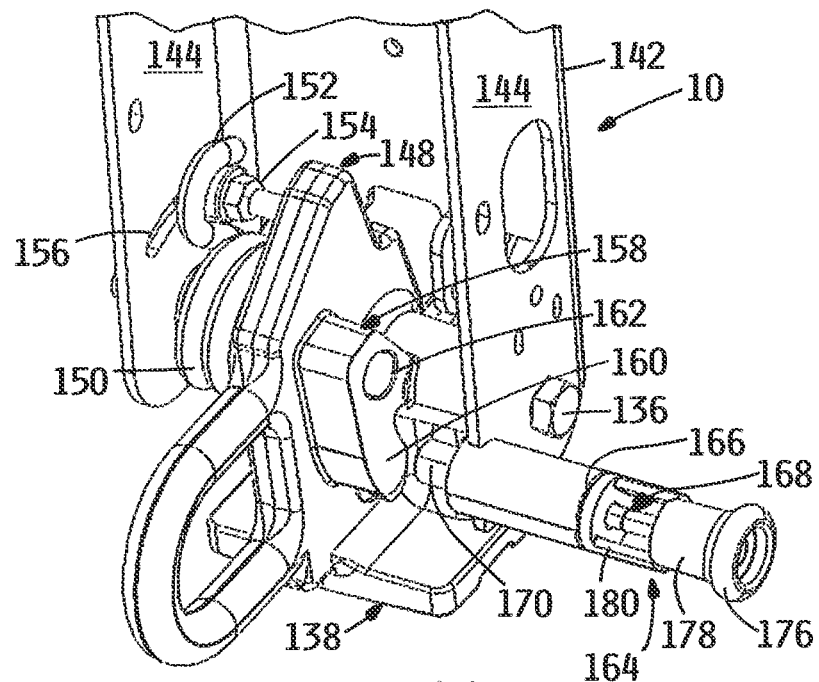
FIG. 14 is a perspective view of a lower portion of the handle assembly of the aerator of FIG. 1, particularly illustrating an adjustment mechanism for pivotally adjusting the handle assembly with a pop pin retainer for holding the handle assembly in a pivotally adjusted operating position being displaced slightly laterally outwardly in FIG. 14 to illustrate the inner end of the pop pin.
Figure 15:
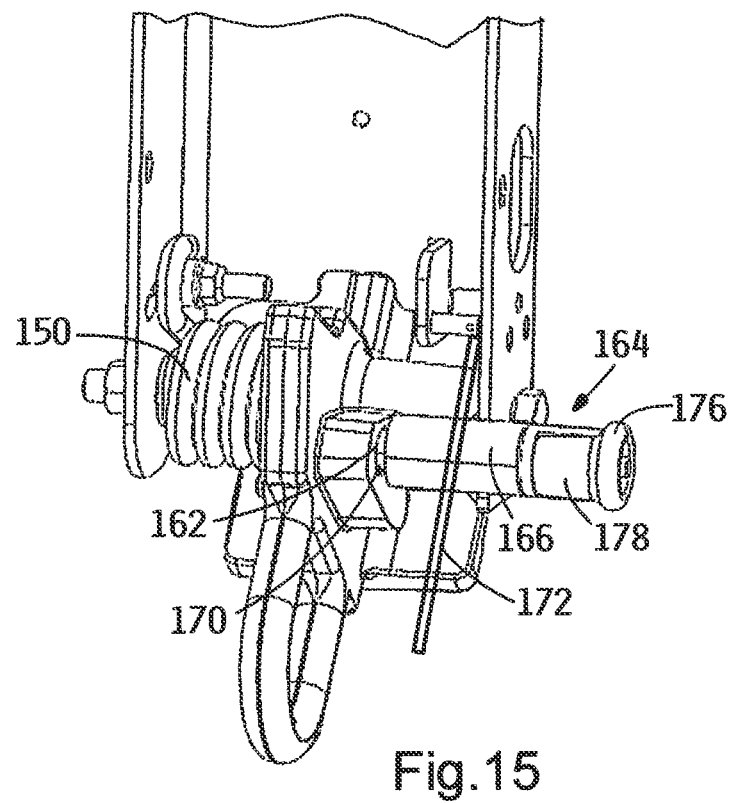
FIG. 15 is a perspective view similar to FIG. 14, particularly illustrating the retainer disposed in its installed position with the retainer being used to lock the handle assembly in an upright non-operating position.

Referring to FIGS. 14 and 15, handle assembly 10 may be equipped with an adjustment mechanism to adjust the height of handle assembly 10 upwardly and downwardly to suit the height and/or the preferences of the operator. The adjustment mechanism comprises a horizontal, laterally extending pivot 136 which pivotally connects handle assembly 10 to a frame member 138. Frame member 138 will be fixed to a rear end of a mount 140 (shown in FIG. 1) which rotatably mounts front wheel 8. Front wheel mount 140 and frame member 138 are not fixed relative to frame 4 since it is the rotation of front wheel mount 140 about a vertical axis on frame 4 that allows the operator to steer front wheel 8 to control the direction of frame 4 and hence of aerator 2. However, for the purposes of describing and claiming the adjustability of handle assembly 10, while frame member 138 and front wheel mount 140 are not a fixed part of frame 4, they will be considered to be a part of frame 4, albeit a part that moves with respect to the rest of frame 4.

Figure 16:
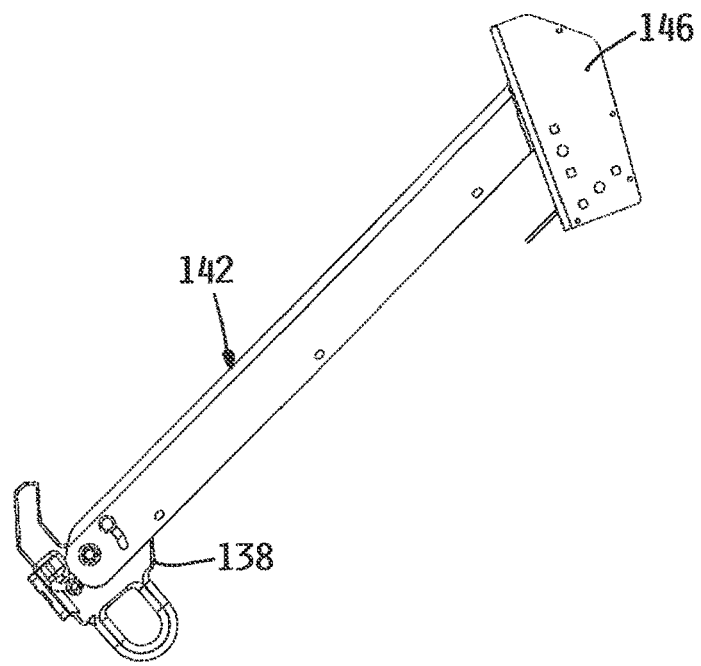
FIG. 16 is a right side elevational view of a portion of the handle assembly of the aerator of FIG. 1, particularly illustrating the handle assembly in a pivotally adjusted operating position thereof.
Figure 17:
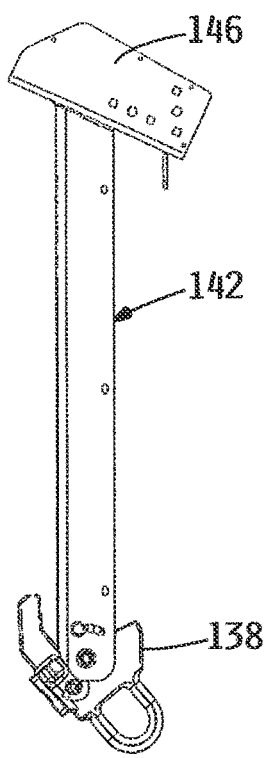
FIG. 17 is a right side elevational view similar to FIG. 12 but illustrating the handle assembly in the upright and locked non-operating position thereof.

Referring now to FIGS. 14 and 15, handle assembly 10 includes an elongated column 142 having a pair of spaced side walls 144. Pivot 136 which pivotally mounts column 142 to frame member 138 is located at the lower end of column 142. As shown in FIGS. 16 and 17, the upper end of column 142 has a mount 146 which is adapted to carry control console 20. Control console 20 is not shown in FIGS. 15 and 16 for the sake of simplicity.

Returning to FIGS. 14 and 15, frame member 138 includes a central plate 148. A torsion spring 150 concentrically surrounds pivot 136. One curled end 152 of torsion spring 150 is clamped in place against one side wall 144 of column 142 by an elongated bolt 154 that passes through an arcuate elongated slot 156 in the one side wall 144. The other curled end of torsion spring 150 (not visible in FIGS. 14 and 15) is clamped to the adjacent side of central plate 148 of frame member 138 in a fixed location. The tension within spring 150 can be selectively adjusted by moving bolt 154 to different positions along slot 156 in order to increase or decrease the bias provided by spring 150 which counterbalances the weight of handle assembly 10.

The opposite side of central plate 148 of frame member 128 has a lateral protrusion 158 which forms a vertical surface 160 located below an inwardly extending locking hole 162 in the upper end of protrusion 158. A pop pin retainer 164 includes a housing 166 which is fixed to the other side wall 144 of column 142 to mount retainer 164 on handle assembly 10. In FIG. 14, the entire pop pin retainer 164 is shown pulled slightly outwardly from its installed position in FIG. 14 to expose vertical surface 160 of protrusion 158.

A pop pin 168 has an inner, enlarged end 170 which is continuously biased by a spring (not shown) within housing 166 outwardly of housing 166 towards vertical surface 160 of protrusion 158. The operator may easily pivot handle assembly 10 upwardly or downwardly about pivot 136 since most of the weight of handle assembly 10 is counterbalanced by torsion spring 150. However, the force of the enlarged end 170 of pop pin 168 acting against vertical surface 160 will be sufficient to help hold handle assembly 10 in whatever pivotally adjusted position the operator has chosen. This adjustability allows the operator to easily adjust the height of control console 20 upwardly if the operator is taller and downwardly if the operator is shorter. All the operator need do is simply grab handle 22 on control console 20 and lift handle 22 upwardly or push handle 22 downwardly. Pop pin 168 will retain handle 22 in whatever vertically adjusted position it has been placed into.

Handle assembly 10 can be additionally manipulated to allow help the operator to easily set a parking brake (not shown) when aerator 2 is being placed into an upright, non-operational position. All the operator need do is to pivot handle assembly 10 into a position where column 142 is vertical as best shown in FIG. 17. When handle assembly 10 reaches this position, first end 170 of pop pin 168 will automatically pop inwardly into locking hole 162 to positively lock handle assembly 10 in place in this position. Referring to FIG. 15, a parking cable 172 attached to column 142 will be pulled forwardly to engage the parking brake when the vertical position of handle assembly 10 is reached.

In order to release pop pin 168 from this locked condition, the outer end of pop pin 168 is connected to a knob 176 for manually pulling or retracting pop pin 168 against the bias of the spring to pull first end 170 of pop pin 168 out of locking hole 162. FIG. 14 depicts such a retraction with various lands 178 on knob 176 having slid outwardly in grooves 180 provided on the top of housing 166. With pop pin 168 pulled out to the degree shown in FIG. 14 and with pop pin 168 having disengaged locking hole 162, the operator need only pivot handle assembly 10 downwardly about pivot pin 136 to clear locking hole 162 and then release knob 176. This will allow first end 170 of pop pin 168 to reengage against vertical surface 160 to allow handle assembly 10 to be disposed back in an operational position at a height chosen by the operator. It will also release tension on parking brake cable 172 to allow the parking brake to reset to its normally disengaged condition.

The weight counterbalance provided by torsion spring 150 along with the position retention provided by pop pin retainer 164 provides the operator with unparalleled ease in adjusting the angular orientation of handle assembly 10 to suit the operator's height or preferences. In addition, by simply placing handle assembly 10 into a non-operational position, the operator can without more lock handle assembly 10 in place and automatically set the parking brake at the same time. This further simplifies the structure and operation of aerator 2.

OTHER MODIFICATIONS

Various modifications of the invention will be apparent to those skilled in the art. For example, the invention is not limited to use on a walk aerator of the type disclosed herein, but could be adapted to aerators in which the operator walks on the ground beside aerator 2 without manually steering aerator 2 and controls aerator 2 using a handheld remote control console having tine head, traction, steering and other controls. Alternatively, the invention could be adapted to an aerator in which the operator is carried directly on aerator 2 or on a separate vehicle to which aerator 2 is hitched.

The structure and method which marks the targeted aeration start and end locations need not be an aeration bail which must be closed and released by the operator. For example, a sensor carried on frame 4 itself which is capable of detecting the boundary between the different turf surfaces, such as an optical sensor capable of sensing the different densities or colorations of the turf surfaces, could automatically mark the targeted aeration start and end locations at each end of the pass without requiring any action by the operator at all other than to guide and control the movement of aerator 2. At the end of the pass, such an automatic sensor would again detect the change from the turf surface on the green and the turf surface on the collar as soon as the sensor reaches the collar. The control system would adjust the targeted aeration end location sent by this occurrence by an amount that moves the targeted end location back onto the green adjacent the collar rather than being on the edge of the collar. This embodiment using an automatic sensor could be also used on an autonomous aerator that is capable of independent operation.

This invention can also be used to sense and avoid obstacles anywhere in a turf surface, such as sprinkler heads, given an input into the system to sense the location of the obstacle and for controller 118 to lift tine head 14 up and over the obstacle and then lower tine head 14 once tine head has passed the obstacle. This could be done by an RFID tag on the obstacle and an RFID reader on aerator 2.

Various other modifications of this invention will be apparent to those skilled in the art. Thus, the scope of this invention shall be limited only by the appended claims.

The invention claimed is:

1. An aerator for a turf surface, which comprises:
(a) a frame capable of movement over the turf surface;
(b) a plurality of tine assemblies movable into and out of the turf surface at different times from one another during each cycle of operation in a plurality of repeating cycles of operation for creating aeration holes in the turf surface;
(c) a tine head mounted on the frame for carrying the tine assemblies, the tine head being vertically movable on the frame between a raised, non-operational position in which the tine assemblies are not aerating the turf surface and a lowered operational position in which the tine assemblies are aerating the turf surface;
(d) at least one tine assembly sensor for providing tine assembly data comprising an operational speed of the tine assemblies and positions of the tine assemblies relative to the tine head; and
(e) a microprocessor based controller which receives and uses the tine assembly data to automatically lower the tine head from its non-operational position in a manner that causes a first tine assembly to move into the turf surface to penetrate the turf surface to a preselected hole depth.

2. The aerator of claim 1, further including at least one tine head height sensor for providing tine head data comprising height of the tine head relative to the frame, wherein the controller stores a first tine head height which represents a condition where lowermost tips of one or more tines of a tine assembly have neared but not entered the turf surface, wherein the controller uses the tine assembly data to determine which tine assembly will immediately precede the first tine assembly, and wherein the controller further receives and uses the tine head data and the first tine head height to lower the tine head in a manner that positions the immediately preceding tine assembly at the first tine head height as a way of causing the first tine assembly to penetrate the turf surface to the preselected hole depth.

3. The aerator of claim 1, wherein the tine assemblies have generally vertical reciprocal motion in each cycle of operation produced by a rotatable crankshaft, and wherein the operational speed of the tine assemblies as detected by the at least one tine assembly sensor comprises a speed of rotation of the crankshaft.

4. The aerator of claim 3, wherein at least some of the tine assemblies connect to the crankshaft at different angular positions having a fixed angular spacing to be operated out of phase relative to one another, and wherein the at least one tine assembly sensor further detects a position of at least one tine assembly during each revolution of the crankshaft with the controller interpolating the positions of other of the out of phase tine assemblies using the fixed angular spacing between the tine assemblies.

5. The aerator of claim 4, wherein the out of phase tine assemblies are disposed in a plurality of groups of multiple tine assemblies with the tine assemblies of each group operating synchronously with each other.

6. The aerator of claim 1, further comprising:
(a) an aeration control having a first state that allows an operator to establish a targeted aeration start location on the turf surface and a second state that allows the operator to establish a targeted aeration end location on the turf surface for each pass of the aerator across the turf surface; and
the microprocessor based controller, which:
(i) upon receipt of the targeted aeration start location, automatically initiates lowering of the tine head at a moment that permits at least some of the tine assemblies carried in the tine head to enter the turf surface to begin aerating the selected turf surface at the targeted aeration start location; and
(ii) upon receipt of the targeted aeration end location, automatically initiates raising of the tine head at a moment that permits the tine assemblies carried in the tine head to exit the turf surface to end aerating the turf surface approximately at the targeted aeration end location.

7. The aerator of claim 6, wherein the aeration control comprises a pivotal bail which defines the first state when the bail is closed by the operator against a fixed handle and which defines the second state when the bail is released by the operator to permit the bail to move away from the fixed handle.

8. The aerator of claim 1, further comprising:
(a) a control console which carries operational controls comprising:
(i) a fixed hand grip which is configured to be gripped by a hand of an operator;
(ii) a movable traction control which is configured to be moved by at least one digit of the operator's hand while the operator's hand is gripping the fixed hand grip to control a variable forward speed of the frame; and
(iii) a first pivotal bail grip adjacent the fixed hand grip, the first pivotal bail grip being configured to be gripped by fingers on the operator's hand and closed against the fixed hand grip to start an aeration operation and further being configured to be released by the operator's fingers for movement away from the fixed hand grip to end an aeration operation.

9. The aerator of claim 8, further including a second pivotal bail grip adjacent the fixed hand grip, the second pivotal bail grip being configured to be engaged by the operator's hand and closed against the fixed hand grip to enable operation of the aerator and further being configured to be released by the operator's hand for movement away from the fixed hand grip to disable operation of the aerator.

10. The aerator of claim 9, wherein the first pivotal bail grip underlies the fixed hand grip and the second pivotal bail grip overlies the fixed hand grip.

11. The aerator of claim 8, wherein the at least one digit of the operator's hand comprises the thumb of the operator's hand, and wherein the traction control is rotatable and has an upwardly facing notch with an open top and an open side to allow the thumb of the operator's hand to be received within the notch when the operator's hand is gripping the fixed hand grip.

12. The aerator of claim 8, wherein the control console is carried on a handle assembly for allowing a walking operator to guide and steer the frame.

13. The aerator of claim 12, wherein the handle assembly is at a front end of the frame taken with respect to the forward direction of motion of the frame and the tine assemblies are at a rear end of the frame taken with respect to the forward direction of motion of the frame.

14. The aerator of claim 1, wherein the microprocessor based controller:
   (i) stores a desired fore-and-aft hole spacing; and
   (ii) automatically adjusts an operational speed of a traction drive during each aeration pass of the aerator to achieve the desired hole spacing.

15. The aerator of claim 14, wherein the automatic adjustment of the operational speed is capable of being overridden by an operator in any turnaround operation between successive aeration passes in which the operator supplies to the controller a traction speed input which commands a turnaround speed higher than the operational speed.

16. The aerator of claim 15, wherein at least one front wheel is provided on a front end of the frame with the at least one front wheel being steerable to control a direction of the frame, and wherein the controller places such at least one front wheel into a freewheel condition during each turnaround operation to mitigate wheel scrubbing.

17. The aerator of claim 1, further comprising:
   (a) a handle assembly operatively connected to a steerable wheel for allowing a walking operator to guide and steer the frame, the handle assembly being adjustable in height on the frame and having a weight which is offset by a spring counterbalance acting between the handle assembly and the frame to ease adjustment of the handle assembly on the frame.

18. The aerator of claim 17, wherein the handle assembly can be disposed in a non-operational position, and wherein a parking brake is automatically engaged by movement of the handle assembly into the non-operational position.

19. A method of operating an aerator having a plurality of tine assemblies associated with a tine head, the method comprising:
   (a) providing, to an electronic controller, tine assembly data comprising an operational speed of the plurality of tine assemblies and positions of the plurality of tine assemblies relative to the tine head;
   (b) storing and processing the tine assembly data at the electronic controller;
   (c) based on the tine assembly data, automatically lowering the tine head from a non-operational position to an operational position in a manner that causes a first tine assembly of the plurality of tine assemblies to move into a turf surface to penetrate the turf surface to a preselected hole depth.

20. The method of claim 19, wherein the step of providing tine assembly data includes providing data from a head height sensor providing tine head data comprising a height of the tine head relative to a frame of the aerator.

21. The method of claim 20, wherein the storing and processing step includes:
   (a) storing a first tine head height which represents a condition where lowermost tips of one or more tines of a tine assembly have neared but not entered the turf surface; and
   (b) using the tine assembly data to determine which tine assembly will immediately precede the first tine assembly.

22. The method of claim 21, wherein the automatically lowering step includes using the tine head data and the first tine head height to lower the tine head in a manner that positions the immediately preceding tine assembly at the first tine head height as a way of causing the first tine assembly to penetrate the turf surface to the preselected hole depth.

23. The method of claim 19, wherein the plurality of tine assemblies have generally vertical reciprocal motion in each cycle of operation produced by a rotatable crankshaft, and wherein the operational speed of the tine assemblies is detected by at least one tine assembly sensor that senses a speed of rotation of the crankshaft.

24. The method of claim 23, wherein at least some of the plurality of tine assemblies connect to the crankshaft at different angular positions having a fixed angular spacing to be operated out of phase relative to one another, and wherein a position of at least one tine assembly during each revolution of the crankshaft with the electronic controller is sensed by a position sensor and the positions of other of the out of phase tine assemblies is interpolated using the fixed angular spacing between the tine assemblies.

25. The method of claim 24, wherein the out of phase tine assemblies are disposed in a plurality of groups of multiple tine assemblies with the tine assemblies of each group operating synchronously with each other.

\* \* \* \* \*